United States Patent
Furuta et al.

(10) Patent No.: US 11,429,286 B2
(45) Date of Patent: Aug. 30, 2022

(54) INFORMATION PROCESSING APPARATUS AND RECORDING MEDIUM STORING INFORMATION PROCESSING PROGRAM

(71) Applicant: FUJITSU LIMITED, Kawasaki (JP)

(72) Inventors: Tomonori Furuta, Nagoya (JP); Tomohiro Uno, Nagoya (JP)

(73) Assignee: FUJITSU LIMITED, Kawasaki (JP)

(*) Notice: Subject to any disclaimer, the term of this patent is extended or adjusted under 35 U.S.C. 154(b) by 8 days.

(21) Appl. No.: 17/067,816

(22) Filed: Oct. 12, 2020

(65) Prior Publication Data
US 2021/0132824 A1    May 6, 2021

(30) Foreign Application Priority Data

Nov. 6, 2019 (JP) .............................. JP2019-201537

(51) Int. Cl.
*G06F 3/06* (2006.01)
*G06F 12/02* (2006.01)

(52) U.S. Cl.
CPC ............ *G06F 3/0619* (2013.01); *G06F 3/067* (2013.01); *G06F 3/0641* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 2009/0198946 A1* | 8/2009 | Ebata | G06F 3/067 711/171 |
| 2011/0055471 A1* | 3/2011 | Thatcher | G06F 3/0608 711/114 |
| 2016/0366226 A1* | 12/2016 | Friedman | G06F 3/0608 |
| 2019/0155927 A1 | 5/2019 | Nagao et al. | |

FOREIGN PATENT DOCUMENTS

| | | |
|---|---|---|
| EP | 3495964 A1 | 6/2019 |
| JP | 2013-516679 A | 5/2013 |
| JP | 2015-513741 A | 5/2015 |
| JP | 2019-95986 A | 6/2019 |
| WO | 2011/084854 A1 | 7/2011 |
| WO | 2013/130410 A1 | 9/2013 |

OTHER PUBLICATIONS

Extended European Search dated Mar. 24, 2021 for corresponding European Patent Application No. 20201994.9, 9 pages. Please note WO-2011/084854-A1 cited herewith, was previously cited in an IDS filed on Oct. 12, 2020.

* cited by examiner

*Primary Examiner* — Michael Alsip
(74) *Attorney, Agent, or Firm* — Fujitsu Patent Center

(57) ABSTRACT

A process for reducing amount of transmission of data to/from an external storage is performed in a computer. The process includes: storing a plurality of data sets by deduplicating a plurality in the external storage, wherein two or more data sets selected in order generated are collected in an object; determining necessity/unnecessity of defragmentation in units of object group in which two or more objects are collected in order generated; when determining to execute defragmentation, executing first defragmentation processing of acquiring all of the objects included in the object group as first objects from the external storage, combining valid data set having a number of references of 1 or more included in the first objects based on the order generated and the number of references to regenerate one or more second object, and storing the second object in place of the first objects in the external storage.

11 Claims, 23 Drawing Sheets

FIG. 5

| FILE NUMBER | OFFSET | SIZE | CHUNK NUMBER |
|---|---|---|---|
| f1 | o1 | s1 | ck1 |
| f1 | o2 | s2 | ck2 |
| f2 | o11 | s11 | ck3 |
| f2 | o12 | s12 | ck4 |
| f2 | o13 | s13 | ck5 |
| f2 | o14 | s14 | ck1 |
| ... | ... | ... | ... |

FIG. 6

Table 113:

| CHUNK NUMBER | OBJECT NUMBER | OFFSET | SIZE | THE NUMBER OF REFERENCES |
|---|---|---|---|---|
| ck1 | ob1 | of1 | sz1 | 1 |
| ck2 | ob1 | of2 | sz2 | 2 |
| ck3 | ob1 | of3 | sz3 | 3 |
| ck4 | ob1 | of4 | sz4 | 1 |
| ... | ... | ... | ... | ... |

Table 114:

| HASH KEY | CHUNK NUMBER |
|---|---|
| hs1 | ck1 |
| hs2 | ck2 |
| hs3 | ck3 |
| hs4 | ck4 |
| ... | ... |

FIG. 8

| OBJECT NUMBER | THE NUMBER OF VALID CHUNKS | THE NUMBER OF INVALID CHUNKS |
|---|---|---|
| ob1 | 9824 | 176 |
| ob2 | 9653 | 347 |
| ... | ... | ... |

INFORMATION PROCESSING APPARATUS AND RECORDING MEDIUM STORING INFORMATION PROCESSING PROGRAM

CROSS-REFERENCE TO RELATED APPLICATION

This application is based upon and claims the benefit of priority of the prior Japanese Patent Application No. 2019-201537, filed on Nov. 6, 2019, the entire contents of which are incorporated herein by reference.

FIELD

The embodiments discussed herein are related to an information processing apparatus and recording medium storing therein an information processing program.

BACKGROUND

Storage services such as online storage services and cloud storage services for providing a storage area have been widespread via a network. The storage gateway functions as the gateway between such storage service and the client computer.

For example, storage gateways for relaying write data between the client computer and the external storage such as the cloud storage have been proposed. The storage gateway receives a data file with a write request from the client's computer, deduplicates data for which writing is requested, and transfers deduplicated data as one or more objects to the external storage.

Concerning the deduplication technology, for example, the system has been proposed in which unreferenced data segments are effectively removed from the deduplication data system by concentrating the mark and sweep operation on the data group that may contain the unreferenced data segments.

Related techniques are disclosed in, for example, Japanese Laid-open Patent Publication No. 2019-95986 and International Publication Pamphlet No. WO 2011/084854.

SUMMARY

According to an aspect of the embodiments, an information processing program that causes a computer to execute an information processing process, the process including: storing a plurality of data sets acquired by deduplicating a plurality of write data sets, for which writing is requested, in an external storage, wherein two or more data sets selected from the plurality of data sets in order of datasets generate (or acquired) are collected in an object and stored in the external storage; determining a necessity or unnecessity of defragmentation in units of object group in which two or more objects among the objects stored in the external storage are collected in order of objects generated; when determining to execute defragmentation of one object group among the object groups, executing first defragmentation processing of acquiring all of the objects included in the one object group as first objects from the external storage, combining a valid data set having a number of references of 1 or more among the data sets included in the first objects based on the order generated and the number of references of the valid data sets to regenerate one or more second objects, and storing the second objects in place of the first objects in the external storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a configuration example of a chunk map table;

FIG. 6 is a diagram illustrating a configuration example of a chunk management table and a hash key table;

FIG. 8 is a diagram illustrating a configuration example of an object management table;

DESCRIPTION OF EMBODIMENTS

In some of the storage gateways described above, defragmentation of the objects transferred to the external storage is performed. In the defragmentation, for example, an object containing a lot of invalid chunks unreferenced from any file is detected from the objects transferred to the external storage. The detected object is acquired by the storage gateway, and only valid chunks in the object are used to reconstruct an object. The reconstructed object is re-transferred to the external storage.

According to such defragmentation, since the object is transferred back and forth between the storage gateway and the external storage at each defragmentation of the object, the number of communications disadvantageously increases. For example, the service of the cloud storage service that is an example of the external storage may be charged according to the number of communications. In this case, as the number of communications increases, the charged amount increases.

From an aspect, an object of the present disclosure is to provide an information processing apparatus and recording medium storing therein an information processing program that may increase the possibility of decreasing the number of communications with an external storage.

Description is given below of embodiments of the present disclosure with reference to the drawings.

First Embodiment

Figure 1:
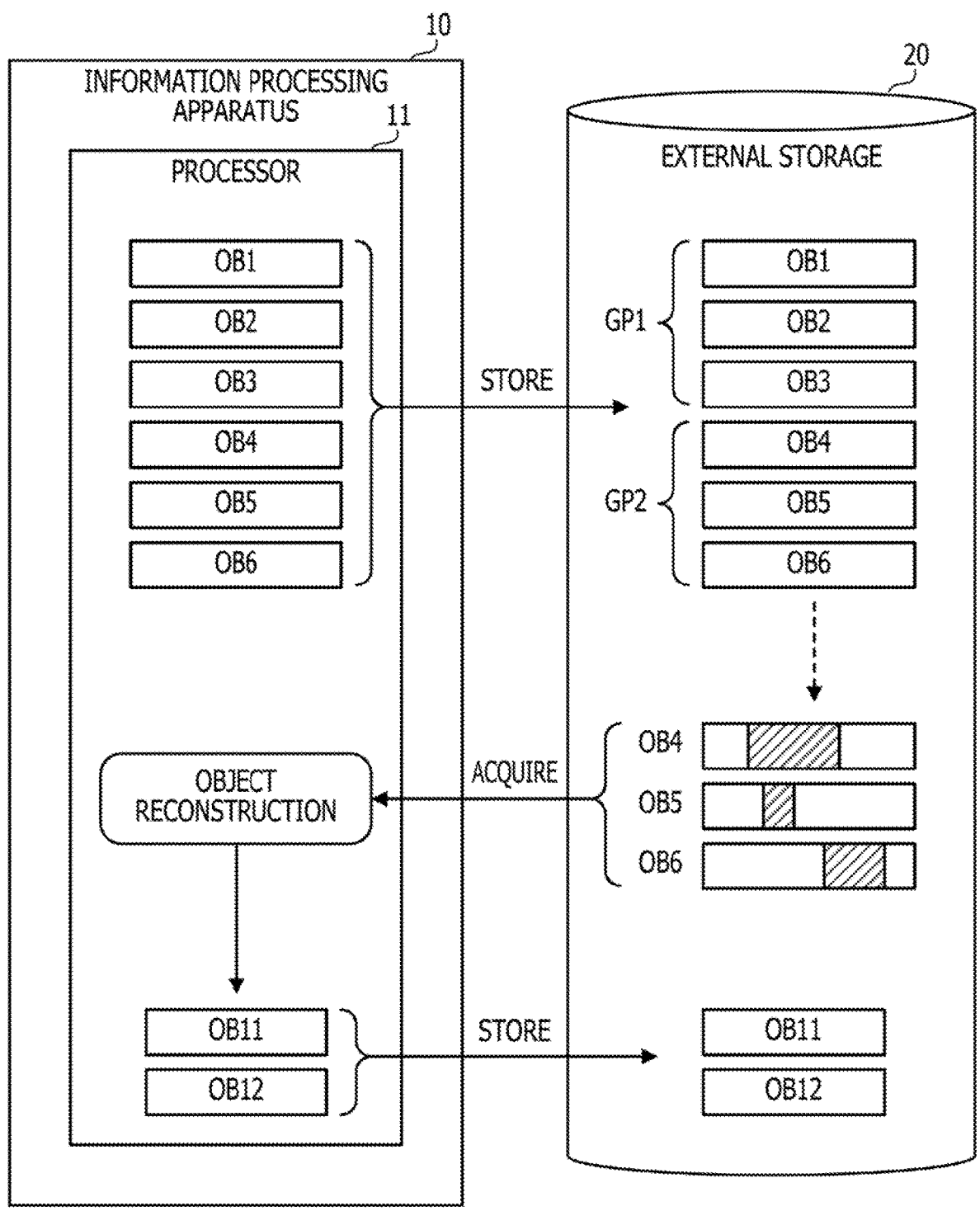
FIG. 1 is a diagram illustrating a configuration example and a processing example of a storage system according to a first embodiment.

FIG. 1 is a diagram illustrating a configuration example and a processing example of a storage system according to a first embodiment. The storage system illustrated in FIG. 1 has an information processing apparatus 10 and an external storage 20 coupled to the outside of the information processing apparatus 10. The information processing apparatus 10 is a controller that controls writing/reading of data to/from the external storage 20. The external storage 20 is coupled to the information processing apparatus 10 via a network (not illustrated), and provides a storage area for data to the information processing apparatus 10 via a network. The external storage 20 is an object storage to/which data is written/read in units of object.

Various functions of the information processing apparatus 10 may be realized by a processor 11 with a program.

The processor 11 receives a write request of a plurality of write data sets from a host device (not illustrated.) For example, the processor 11 receives the write request of the plurality of files, and divides actual data of each of the files to acquire the plurality of write data sets described above.

The processor 11 stores a plurality of data sets acquired by deduplicating the plurality of write data sets in the external storage 20. In the storage processing, the processor 11 collects two or more data sets selected from the plurality of data sets in order occurred into an object, and stores the objects in the external storage 20.

In the example illustrated in FIG. 1, objects OB1 to OB6 are generated from the plurality of data sets acquired by deduplication. For example, two or more data sets are incorporated into the object OB1 in order occurred, and the data set occurring next is incorporated into the object OB2. The processor 11 stores the objects OB1 to OB6 in the external storage 20.

The processor 11 determines the necessity or unnecessity of defragmentation in units of object group in which two or more objects among the objects stored in the external storage 20 are collected in order of objects generated. In the example illustrated in FIG. 1, the objects OB1 to OB3 are managed as an object group GP1, and the objects OB4 to OB6 are managed as the object group GP2. In each of the object groups GP1, GP2, for example, the number of invalid data sets having the number of references "0" among the data sets included in each object group is monitored. For example, when it is determined that the number of invalid data sets is larger than a predetermined threshold, it is determined to perform defragmentation of the concerned object group. The number of references refers to a numerical value indicating the number of referred data sets among the original write data sets.

In FIG. 1, it is assumed that defragmentation of the object group GP2 is performed. In this case, the processor 11 executes a defragmentation processing as explained below. Hatched areas of the objects OB4 to OB6 in FIG. 1 represent areas for invalid data sets.

The processor 11 first acquires all of the objects OB4 to OB6 included in the object group GP2 from the external storage 20. The processor 11 then combines valid data sets having the number of references of 1 or more among the data sets included in the objects OB4 to OB6 to regenerate one or more objects (object reconstruction). In the generation processing, valid data sets included in different objects may be incorporated into the same object. The valid data sets included in different objects may be combined by executing the defragmentation processing in units of object group including a plurality of objects.

In the example illustrated in FIG. 1, it is assumed that objects OB11, OB12 are generated using the valid data sets included in the objects OB4 to OB6. The processor 11 stores the generated objects OB11, OB12 instead of the original objects OB4 to OB6 in the external storage 20. This may delete the invalid data sets from the external storage 20 to reduce the used capacity of the external storage 20.

In generating the objects OB11, OB12, the processor 11 determines how to combine data sets based on the order generated and the number of references for each valid data set. This may further increase the possibility of decreasing the number of times defragmentation of each of the objects OB11, OB12 is performed. As a result, the possibility of decreasing the number of communications between the information processing apparatus 10 and the external storage 20 may be increased.

For example, the processor 11 incorporates data sets determined to be close to each other in the order generated and the number of references among the valid data set included in the objects OB4 to OB6, into the same object. Collecting the data sets that are close to each other in order generated in the same object and storing the object in the external storage 20 increases the possibility that the number of references of each data set in the object is decreased at the same time. Collecting together the data sets that are close to each other in the number of references in the same object and storing the object in the external storage 20 also increases the possibility that the number of references of the data sets in the object decreases uniformly.

Thus, the possibility that invalid data sets gradually occurs at dispersed positions in the object over time decreases, conversely resulting in that a lot of invalid data sets tend to occur in the object at one time. Accordingly, when it is determined that defragmentation of the object is to be executed again, it is highly likely that a lot of invalid data sets may be deleted at one time. As a result, as compared to the case where invalid data sets gradually increases in the object over time, it is more likely that the number of times of defragmentation of the same object decreases.

Accordingly, the possibility of decreasing the number of communications between the information processing apparatus 10 and the external storage 20 is increased. The decrease in the number of communications also reduces a traffic between the information processing apparatus 10 and the external storage 20.

Second Embodiment

Next, the case where a cloud storage is used as the external storage in FIG. 1 and a cloud storage gateway is used as the information processing apparatus 10 in FIG. 1 will be described.

Figure 2:
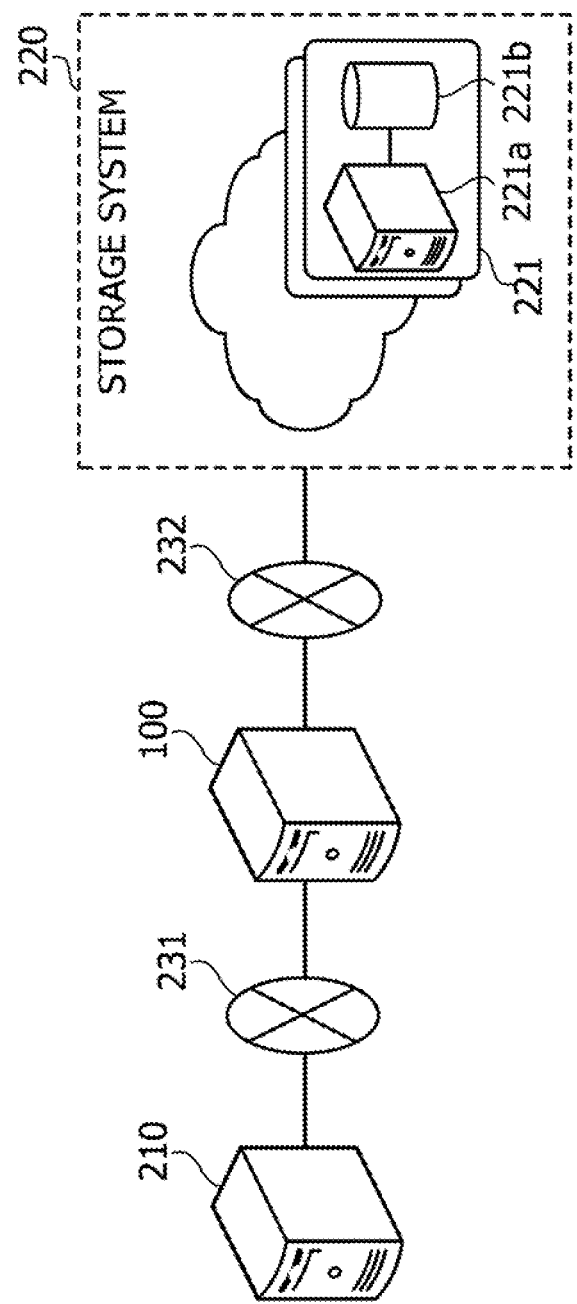
FIG. 2 is a diagram illustrating a configuration example of an Information processing system according to a second embodiment.

FIG. 2 is a diagram illustrating a configuration example of an information processing system according to a second embodiment. The information processing system illustrated in FIG. 2 includes a cloud storage gateway 100, a network attached storage (NAS) client 210, and a storage system 220. The cloud storage gateway 100 is coupled to the NAS client 210 via a network 231, and is also coupled to the storage system 220 via a network 232. The network 231 is, for example, a local area network (LAN), and the network 232 is, for example, a wide area network (WAN).

The storage system 220 provides a cloud storage service via the network 232. In following description, a storage area made available to a service user (cloud storage gateway 100 in this example) by a cloud storage service provided by the storage system 220 may be referred to as "cloud storage".

In this embodiment, as an example, the storage system 220 is implemented by an object storage in which data is managed in a form of object. For example, the storage system 220 is implemented as a distributed storage system having multiple storage nodes 221 each including a control server 221a and a storage device 221b. In this case, in each storage node 221, the control server 221a controls access to the storage device 221b, and part of the cloud storage is implemented by a storage area of the storage device 221b. The storage node 221 to be the storage destination of an object from the service user (cloud storage gateway 100) is determined based on information unique to the object.

Meanwhile, the NAS client 210 recognizes the cloud storage gateway 100 as a NAS server that provides a storage area managed by a file system. The storage area is a storage area of the cloud storage provided by the storage system 220. The NAS client 210 then requests the cloud storage gateway 100 to read and write data in a form of file according to, for example, the Network File System (NFS) protocol or the Common Internet File System (CIFS) protocol. For example, a NAS server function of the cloud storage gateway 100 allows the NAS client 210 to use the cloud storage as a large-capacity virtual network file system.

The NAS client 210 executes, for example, backup software for data backup. In this case, the NAS client 210 backs up a file stored in the NAS client 210 or a file stored in a server (for example, a business server) coupled to the NAS client 210, to a storage area provided by the NAS server.

The cloud storage gateway 100 is an example of the information processing apparatus 10 illustrated in FIG. 1. The cloud storage gateway 100 relays data transferred between the NAS client 210 and the cloud storage.

For example, the cloud storage gateway 100 receives a file write request from the NAS client 210 and caches a file for which the write request is made in itself by using the NAS server function. The cloud storage gateway 100 divides the file for which the write request is made in a form of chunk and stores actual data in the chunks (chunk data) in the cloud storage. At this time, a predetermined number of chunk data are grouped to generate an object, and the generated object is transferred to the cloud storage.

When caching the file from the NAS client 210, the cloud storage gateway 100 performs "deduplication" by dividing the file in units of chunks and avoiding duplicate saving of chunk data having the same contents. The chunk data may also be stored in a compressed state. For example, in a cloud storage service, a fee is charged depending on the amount of data to be stored in some cases. Performing deduplication and data compression may reduce the amount of data stored in the cloud storage and suppress the service use cost.

Figure 3:
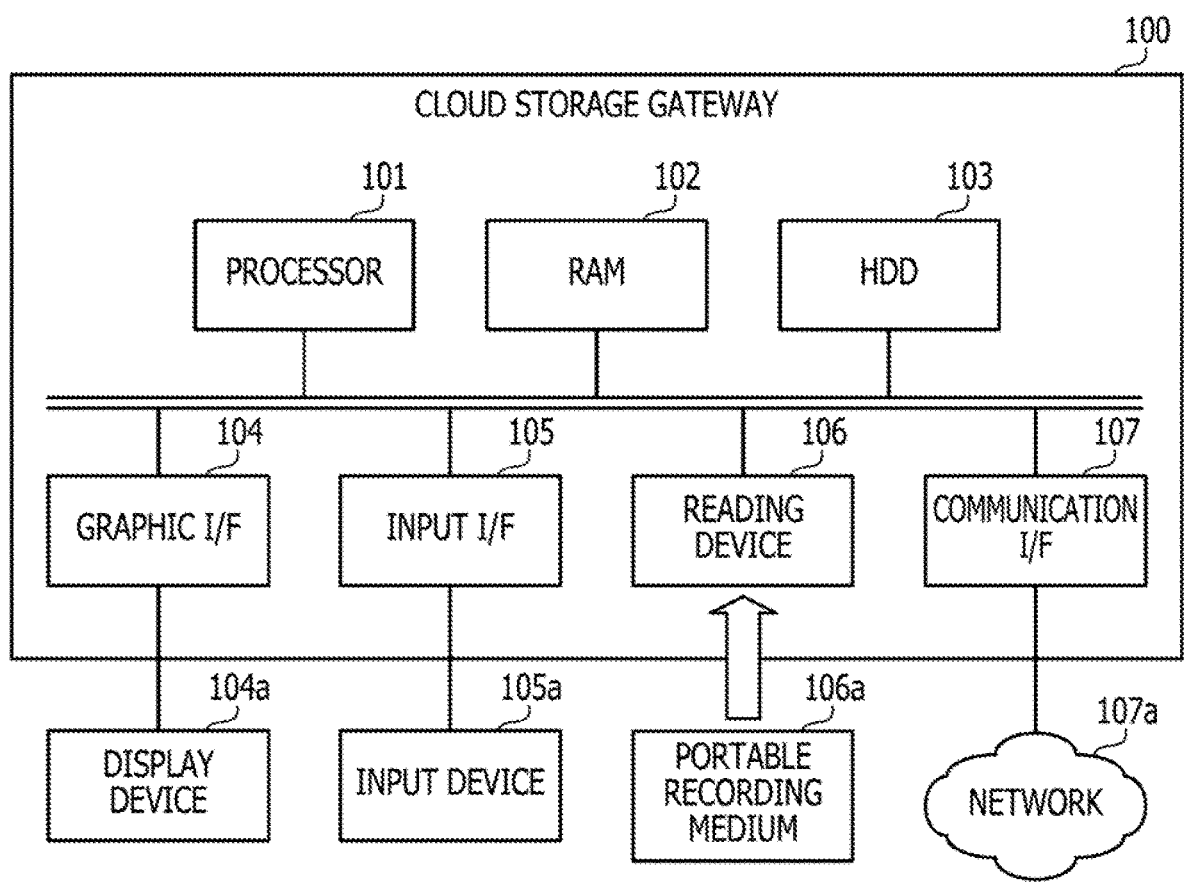
FIG. 3 is a block diagram illustrating a hardware configuration example of a cloud storage gateway.

FIG. 3 is a block diagram illustrating a hardware configuration example of the cloud storage gateway. The cloud storage gateway 100 is implemented as, for example, a computer as illustrated in FIG. 3.

The cloud storage gateway 100 includes a processor 101, a random-access memory (RAM) 102, a hard disk drive (HDD) 103, a graphic interface (I/F) 104, an input interface (I/F) 105, a reading device 106, and a communication interface (I/F) 107.

The processor 101 generally controls the entire cloud storage gateway 100. The processor 101 is, for example, a central processing unit (CPU), a microprocessor unit (MPU), a digital signal processor (DSP), an application-specific integrated circuit (ASIC), or a programmable logic device (PLD). The processor 101 may also be a combination of two or more of elements of the CPU, the MPU, the DSP, ASIC, and the PLD.

The RAM 102 is used as a main storage device of the cloud storage gateway 100. At least part of an operating system (OS) program and an application program to be executed by the processor 101 is temporarily stored in the RAM 102. Various kinds of data to be used in processing by the processor 101 are also stored in the RAM 102.

The HDD 103 is used as an auxiliary storage device of the cloud storage gateway 100. The OS program, the application program, and various kinds of data are stored in the HDD 103. A different type of nonvolatile storage device such as a solid-state drive (SSD) may be used as the auxiliary storage device.

A display device 104a is coupled to the graphic interface 104. The graphic interface 104 displays an image on the display device 104a according to a command from the processor 101. The display device includes a liquid crystal display, an organic electroluminescence (EL) display, and the like.

An input device 105a is coupled to the input interface 105. The input interface 105 transmits a signal outputted from the input device 105a to the processor 101. The input device 105a includes a keyboard, a pointing device, and the like. The pointing device includes a mouse, a touch panel, a tablet, a touch pad, a track ball, and the like.

A portable recording medium 106a is removably mounted on the reading device 106. The reading device 106 reads data recorded in the portable recording medium 106a and transmits the data to the processor 101. The portable recording medium 106a includes an optical disc, a semiconductor memory, and the like.

The communication interface 107 exchanges data with other apparatuses via a network 107a. The processing functions of the cloud storage gateway 100 may be implemented by the hardware configuration as described above. The NAS client 210 and the control server 221a may also be implemented as computers having the same hardware configuration as that in FIG. 3.

Figure 4:
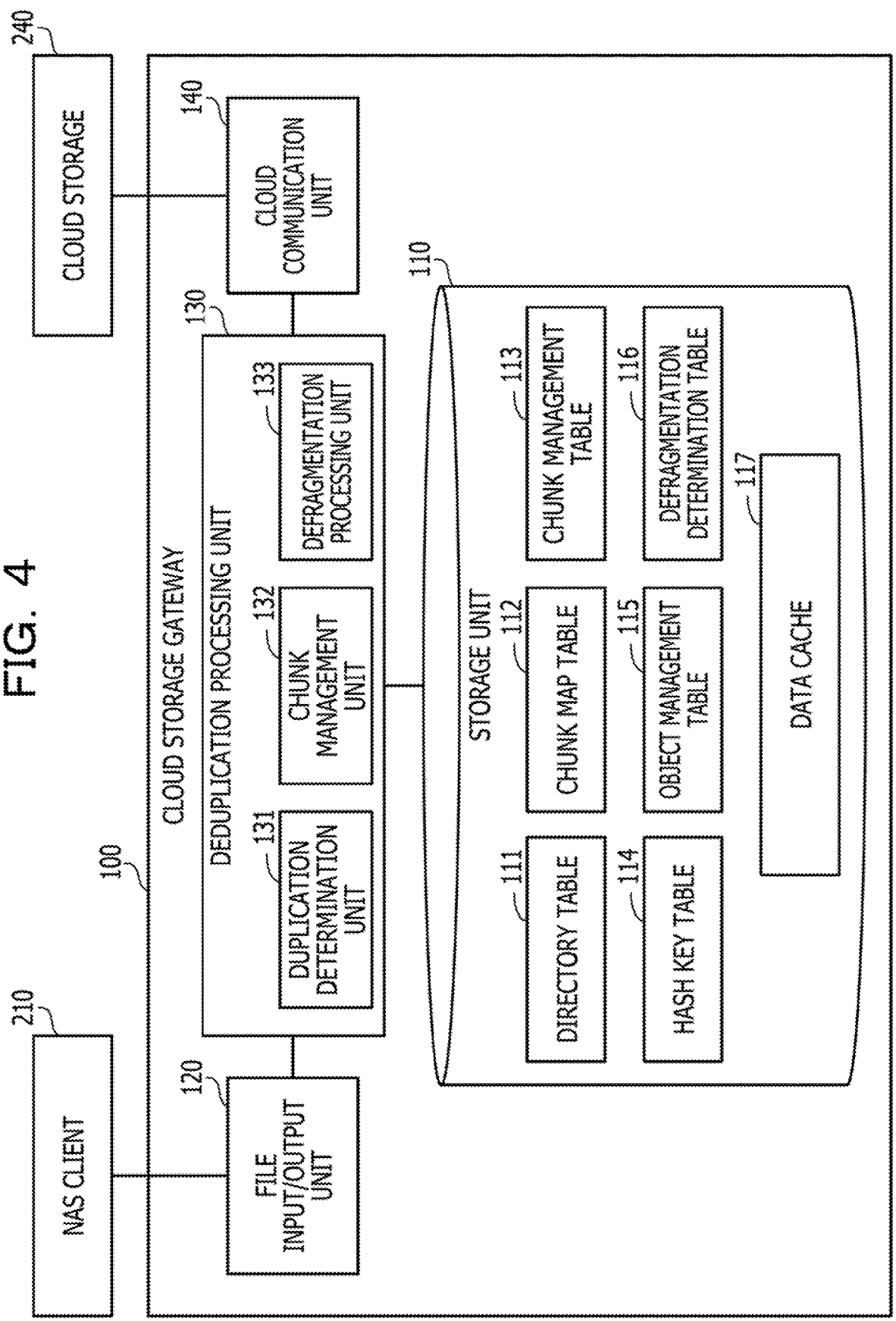
FIG. 4 is a block diagram illustrating a configuration example of processing functions included in the cloud storage gateway.

FIG. 4 is a block diagram illustrating a configuration example of processing functions included in the cloud storage gateway. The cloud storage gateway 100 includes a storage unit 110, a file input/output unit 120, a deduplication processing unit 130, and a cloud communication unit 140.

The storage unit 110 is implemented as, for example, a storage area of a storage device included in the cloud storage gateway 100, such as the RAM 102 or the HDD 103. Processing of the file input/output unit 120, the deduplication processing unit 130, and the cloud communication unit 140 is implemented, for example, by causing the processor 101 to execute a predetermined program.

The storage unit 110 stores a directory table 111, a chunk map table 112, a chunk management table 113, a hash key table 114, an object management table 115, and a defragmentation determination table 116. Part of the storage area of the storage unit 110 is used as a data cache 117.

The directory table 111 is management information for representing a directory structure in a file system. In the directory table 111, records corresponding to directories (folders) in the directory structure or to files in the directories are registered. In each record, an inode number for identifying a directory or a file is registered. For example, relationships between directories and relationships between directories and files are expressed by registering the inode number of the parent directory in each record.

The chunk map table 112 is management information for managing correspondences between files and deduplicated chunks. The chunk management table 113 is management information for managing correspondences between chunks and objects, and the number of references of chunks. The hash key table 114 is management information for managing the hash key corresponding to the chunk.

The object management table 115 is management information for managing, for each object, the number of valid chunks indicating valid chunks among chunks included in the object and the number of invalid chunks indicating invalid chunks among chunks included in the object. The defragmentation determination table 116 is management information for managing, for each object group described below, the number of valid chunks indicating valid chunks among chunks included in the object group and the number of invalid chunks indicating invalid chunks among chunks included in the object group. The object management table 115 and the defragmentation determination table 116 are used to determine the necessity or unnecessity of defragmentation of objects stored in a cloud storage 240.

The data cache 117 is a storage area for caching deduplicated chunks. Data of chunks corresponding to a file for which the write request is made from the NAS client 210 is deduplicated and temporarily stored in the data cache 117 and then, incorporated into an object and stored in the cloud storage 240. When the capacity of the data cache 117 is decreased by storing chunks, chunks that are stored in the cloud storage 240 and infrequently accessed from the NAS client 210 are deleted from the data cache 117.

The file input/output unit 120 executes interface processing as a NAS server. For example, the file input/output unit 120 accepts a file write/read request from the NAS client 210, requests the deduplication processing unit 130 to execute processing corresponding to the requested contents, and responds to the NAS client 210.

In response to the request from the deduplication processing unit 130, the cloud communication unit 140 executes communication processing with the cloud storage 240. For example, the deduplication processing unit 130 transmits and receives objects to and from the cloud storage 240 that is the object storage. The deduplication processing unit 130 uploads objects to the cloud storage 240 according to a PUT command. The deduplication processing unit 130 acquires objects from the cloud storage 240 according to a GET command. The deduplication processing unit 130 deletes objects in the cloud storage 240 according to a DELETE command.

The deduplication processing unit 130 executes processing of storing deduplicated actual data of a file. The deduplication processing unit 130 includes a duplication determination unit 131, a chunk management unit 132, and a defragmentation processing unit 133.

The duplication determination unit 131 divides actual data of a file for which the write request is made in units of chunk in the data cache 117, and stores the divided actual data while being deduplicated.

The chunk management unit 132 collects a plurality of chunks stored in the data cache 117 by the duplication determination unit 131 to generate an object of proper size, and stores the object in the cloud storage 240 via the cloud communication unit 140. In this embodiment, as an example, a predetermined number of chunks forms an object.

The defragmentation processing unit 133 monitors chunks that become unreferenced due to file updating or delete request (invalid chunks) and performs defragmentation based on a monitoring result. The defragmentation is processing of deleting the occurred invalid chunks from the cloud storage 240 to reduce the used capacity of the cloud storage 240. In defragmentation, basically, the object including invalid chunks is acquired from the cloud storage 240, remaining chunks with the invalid chunk data deleted reconstruct an object, and the reconstructed object is stored in the cloud storage 240.

Next, the management information used in the deduplication processing will be described with reference to FIGS. 5 to 7. FIG. 5 is a diagram illustrating a configuration example of the chunk map table. The chunk map table 112 is management information for managing correspondences between files and deduplicated chunks. As illustrated in FIG. 5, records with items including file number, offset, size, and chunk number are registered in the chunk map table 112. Each record is associated with one chunk generated by dividing the actual data of the file.

The file number indicates file identification number. The offset indicates the amount of offset from the start of the file to the start of the chunk. The size indicates size of chunk. An area of the chunk in the file is identified based on values of offset and size.

The chunk number indicates an identification number of deduplicated chunk corresponding to the chunk of the file. When a first chunk of a certain file and a second chunk of the same or another file have the same data contents, the same chunk number is registered in the record corresponding to the first chunk and the record corresponding to the second chunk. For example, in FIG. 5, the same chunk number "ck1" is registered in a chunk record identified based on a file number "f1" and an offset "o1" and a chunk record identified based on a file number "f2" and an offset "o14". This means that the former chunk and the latter chunk have the same data contents, and the data is stored as the chunk having the chunk number "ck1" in the data cache 117 and the cloud storage 240.

The chunk number is added in the order in which unique and unduplicated chunk occurs and is stored in the data cache 117. Thus, the chunk number indicates the order occurred or stored of the deduplicated chunks.

FIG. 6 is a diagram illustrating a configuration example of the chunk management table and the hash key table. The chunk management table 113 is management information for managing correspondences deduplicated chunks and objects, and the number of references of chunks. As illustrated in FIG. 6, records with items including chunk number, object number, offset, size, and the number of references are registered In the chunk management table 113. Each record is associated with one deduplicated chunk.

The object number indicates identification number of an object to which the chunk belongs. The offset indicates the amount of offset from the start of the object to the start of the chunk. The size indicates size of chunk. An area of the chunk in the object is identified based on values of offset and size. The number of references indicates how many chunks among the chunks generated by dividing the file refer to the chunk indicated by the chunk number. For example, the number of references indicates how the chunk indicated by the chunk number overlaps among the chunks of the file. For example, the number of references corresponding to a certain chunk number is "2", two records that registers the same chunk number therein are present in the chunk map table 112.

In the example illustrated in FIG. 5, the file having the file number "f1" is divided into two chunks, and the file having the file number "f2" is divided into four chunks. In the example illustrated in FIG. 6, data of the two chunks included in the former file and data of the first two chunks included in the latter file are stored as chunks belonging to the object having an object number "ob1" in the cloud storage 240.

The hash key table 114 is management information for managing hash keys corresponding to deduplicated chunks. As illustrated in FIG. 6, the hash keys are associated with the chunk numbers and registered in the hash key table 114. The hash key is a hash value calculated based on chunk data, and is used to search the same chunk as the data of the chunk of a file for which the write request is made.

Figure 7:
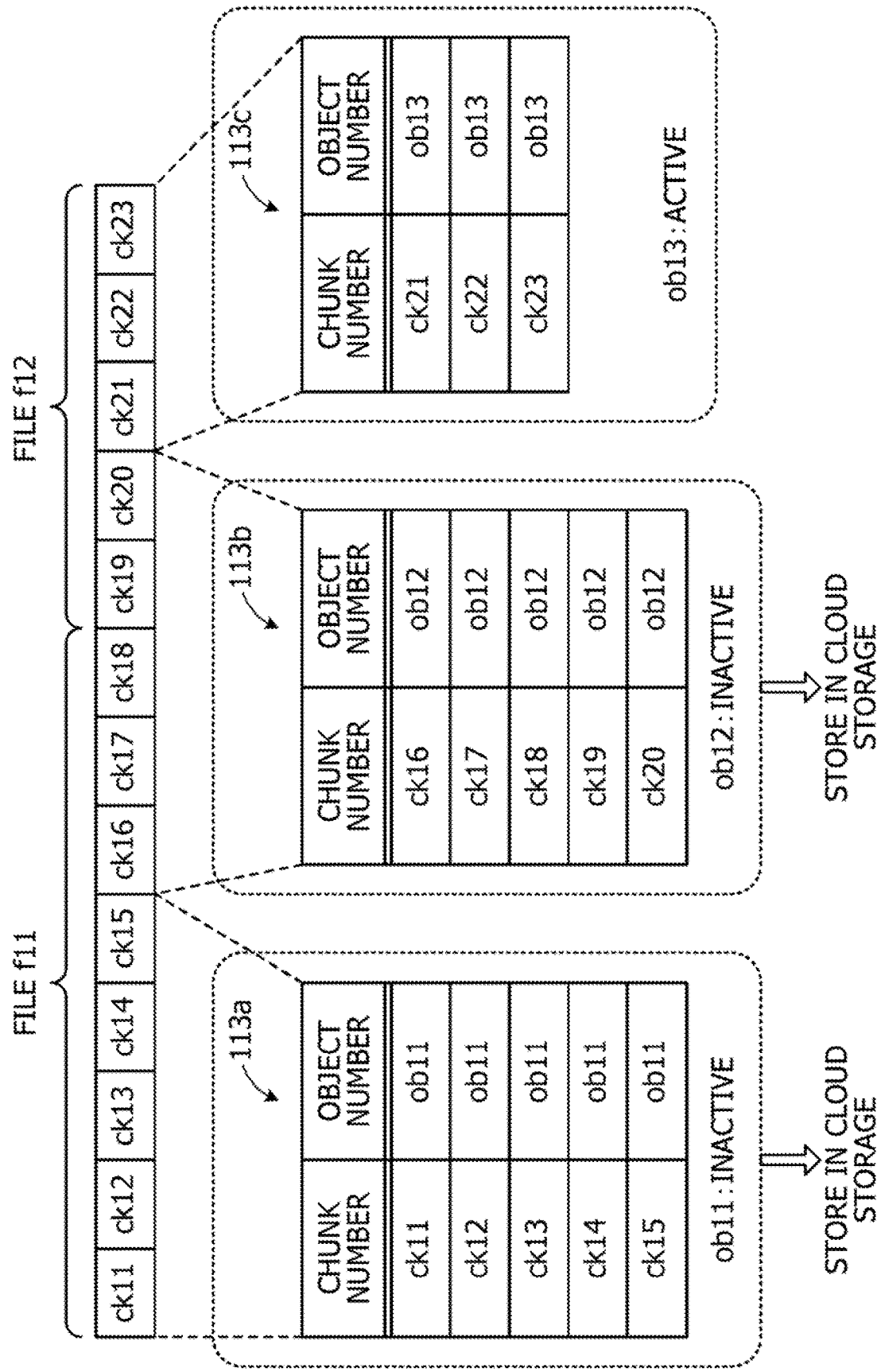
FIG. 7 is a diagram illustrating an example of generation of objects.

FIG. 7 is a diagram illustrating an example of generation of objects. With reference to FIG. 7, a method of generating objects will be described below. In a table 113a illustrated in FIG. 7, items of the chunk number and the object number of records corresponding to chunks belonging to the objects having an object number "ob11" are extracted from the chunk management table 113. Similarly, in a table 113b illustrated in FIG. 7, items of the chunk number and the object number of records corresponding to chunks belonging to the objects having an object number "ob12" are extracted from the chunk management table 113. In a table 113c illustrated in FIG. 7, items of the chunk number and the object number of records corresponding to chunks belonging to the objects having an object number "ob13" are extracted from the chunk management table 113.

When writing of a new file or updating of an existing file is requested from the NAS client 210, the duplication determination unit 131 divides actual data of the file in units of chunk. In the example illustrated in FIG. 7, it is assumed that actual data of a file f11 is divided into eight chunks, and actual data of a file f12 is divided into five chunks.

For simplification of description, it is given that all data of these chunks are different (not duplicated). Thus, chunk numbers "ck11" to "ck18" are added to respective chunk data acquired by dividing the file f11, and chunk numbers "ck19" to "ck23" are added to respective chunk data acquired by dividing the file f12. Chunk data (chunks ck11 to ck23) corresponding to the chunk numbers "ck11" to "ck23" are independently stored in the data cache 117.

The object number of the object is assigned to each chunk, and the object number is registered in the chunk management table 113. In this embodiment, when the number of chunks assigned to the same object number reaches a predetermined number, the object number is increased, and the increased object number is assigned to a next chunk. Thereby, the predetermined number of chunks are assigned to the same object.

The object in which the number of chunks does not reach the predetermined number is referred to as "active" object that may accept a next chunk. The active object is an incomplete object that is not ready to be stored in the cloud storage 240. The object in which the number of chunks reaches the predetermined number is referred to as "inactive" object that may not accept a next chunk. The inactive object is an object that is ready to be stored in the cloud storage 240, and is transferred to the cloud storage 240 at a predetermined timing.

In the example illustrated in FIG. 7, first, the chunks ck11 to ck15 are assigned to the object having the object number "ob11" (object ob11). At this stage, it is assumed that the number of chunks included in the object ob11 reaches the predetermined number (5 in FIG. 7) and the object ob11 becomes inactive. The new object number "ob12" is assigned to the next chunk ck16.

After that, it is assumed that the chunks ck16 to ck20 are assigned to the object having the object number "ob12" (object ob12), and the object ob12 becomes inactive in this stage. A new object number "ob13" is assigned to the next chunk ck21. In the example illustrated in FIG. 7, the chunks ck21 to ck23 are assigned to the object having the object number "ob13" (object ob13), but the object ob13 is active in this stage. In this case, the object number "ob13" is assigned to a chunk to be generated next (not illustrated).

According to the above procedure, in generating objects with file writing, a new object is completed each time the predetermined number of chunks occur as a result of deduplication. The object number is added to the object in the order generated. Chunks having consecutive chunk numbers are assigned to one object.

In FIG. 7 described above, the case where there is no redundant data has been described. For example, after that, when the chunk including the same data contents as the data contents of any of the chunks ck11 to ck23 is present in chunks in a file for which the write request is made, the data on the chunk is not stored in the data cache 117 and is not transferred to the cloud storage 240. For example, actual data of the chunk is not written, and only metadata associating the file with the stored chunk is written in the chunk map table 112. In this way, the "deduplication processing" for suppressing storage of redundant data is executed.

In this embodiment, when the predetermined number of chunks are assigned to an object, the object becomes inactive. However, in another approach, for example, when the total size of chunks assigned to an object exceeds predetermined size, the object may be inactive.

Next, management information used to determine the necessity or unnecessity of defragmentation will be described with reference to FIG. 8 and FIG. 9.

FIG. 8 is a diagram illustrating a configuration example of an object management table. The number of valid chunks and the number of invalid chunks are registered in the object management table 115 in association with the object number. The number of valid chunks indicates the number of valid chunk data (chunk data having the number of references of 1 or more) among chunk data included in an object. The number of invalid chunks indicates the number of invalid chunk data (chunk data having the number of references of 0) among chunk data included in an object.

Figure 9:
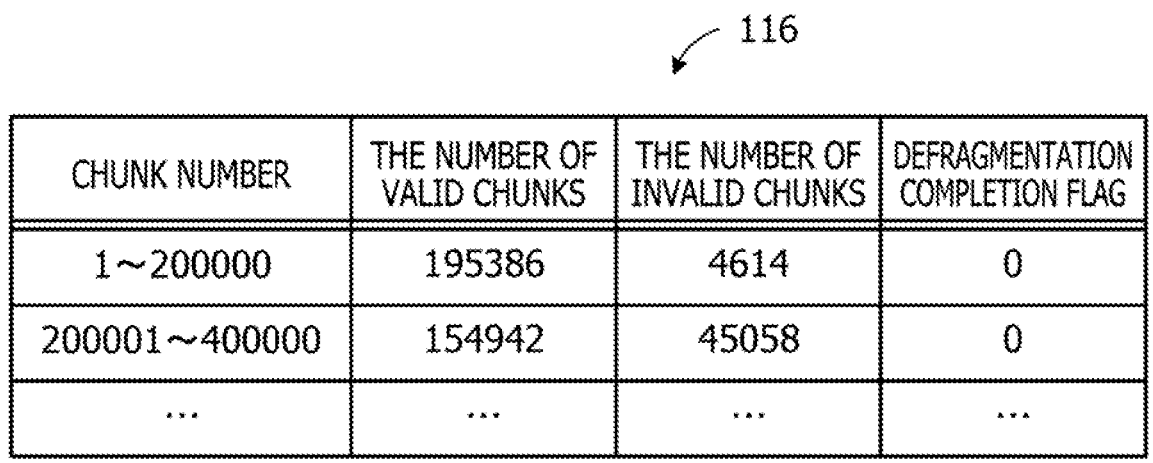
FIG. 9 is a diagram illustrating a configuration example of a defragmentation determination table.

FIG. 9 is a diagram illustrating a configuration example of a defragmentation determination table. The defragmentation determination table 116 is management information for managing the number of valid chunks and the number of invalid chunks for each object group including a plurality of objects. The number of valid chunks and the number of invalid chunks are registered in the defragmentation determination table 116 in association with the chunk number of chunk data included in the object group. In generating the object with writing of a file, a predetermined number (for example, 20) of objects is grouped into one object group.

A defragmentation completion flag is also registered in each record in the defragmentation determination table 116. The defragmentation completion flag is flag information indicating whether defragmentation has been performed for a concerned object group once or more. As an example, the value of the defragmentation completion flag is set to "0" when defragmentation has not been performed, and to "1" when defragmentation has been performed even once.

In the service offering the object storage such as the cloud storage 240, a fee is generally charged depending on used capacity. In some services, a fee is charged for communications using the GET command, the PUT command, and the like. For example, a fee may be charged depending on the number of communications using commands, or the amount of communication data.

The cloud storage gateway 100 suppresses data having the same contents are redundantly stored in the cloud storage 240 by using the deduplication technique. This reduces the used capacity of the cloud storage 240. Due to deletion or updating of files, an invalid chunk that is unreferenced from any file may occur. The cloud storage gateway 100 performs defragmentation to delete invalid chunks from the cloud storage 240. This may further reduce the used capacity of the cloud storage 240.

However, the service offering the object storage such as the cloud storage 240 does not generally provide a command to delete only a part of the data area in the object. For this reason, in a basic defragmentation procedure, an object including Invalid chunks is acquired, and the invalid chunks are removed to reconstruct an object and then, the reconstructed object is transmitted.

As described above, to perform defragmentation once, communications between the cloud storage 240 and the cloud storage gateway 100 may be often made multiple times. For this reason, in the service charged to communication, performing defragmentation increases communication costs. Thus, there is a demand to reduce the number of communications and the amount of communication data in performing defragmentation as much as possible.

A comparative example of a defragmentation processing procedure will be described by using FIG. 10 to FIG. 14 and subsequently, a defragmentation processing procedure according to the second embodiment will be described.

Figure 10:
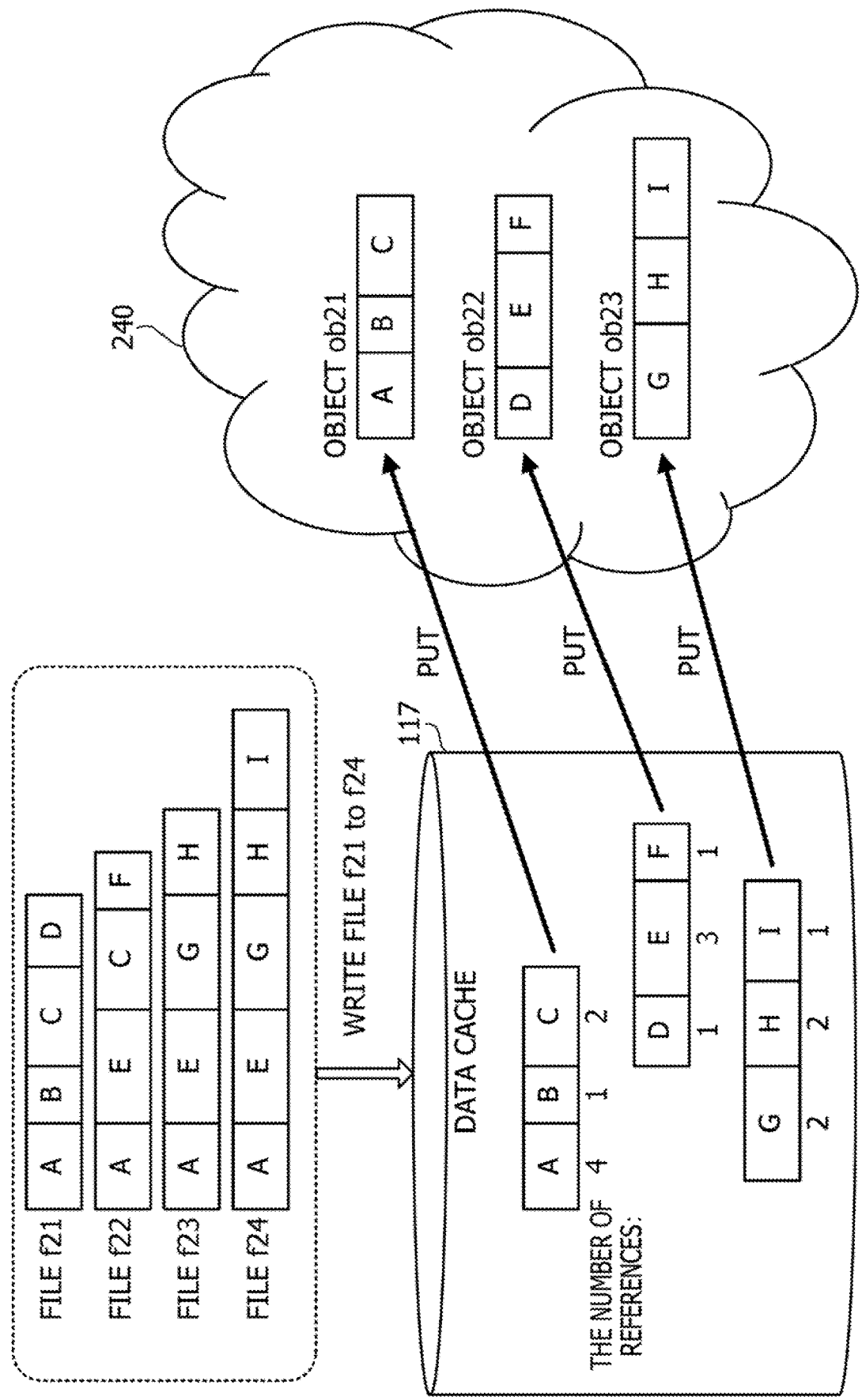
FIG. 10 is a first diagram illustrating a comparative example of a defragmentation processing procedure.

FIG. 10 is a first diagram illustrating a comparative example of the defragmentation processing procedure. In the example illustrated in FIG. 10, writing of files f21 to f24 is sequentially requested from the NAS client 210 to the cloud storage gateway 100 illustrated in FIG. 4.

By variable length chunking, the file f21 is divided into chunks A to D, the file f22 is divided into chunks A, E, C, and F, the file f23 is divided into chunks A, E, G, and H, and the file f24 is divided into chunks A, E, G, H, and I. It is assumed that the chunks with the same letters have the same data contents. For example, the chunks A divided from the files f21 to f24 have the same data contents. For example, data of chunk A are redundant in the files f21 to f24.

When writing of the files f21 to f24 is requested, the chunks A to I are stored one by one in the data cache 117 by deduplication processing. The number of references (duplicate number) corresponding to the chunks A to I are "4", "1", "2", "1", "3", "1", "2", "2", and "1", respectively.

In FIG. 10, as an example, three chunks are assigned to an object. In this case, the chunks A to C generates an object ob21, the chunks D to F generates an object ob22, and the chunks G to I generates an object ob23. The objects ob21 to ob23 are uploaded from the cloud storage gateway 100 to the cloud storage 240 according to the PUT command.

Figure 11:
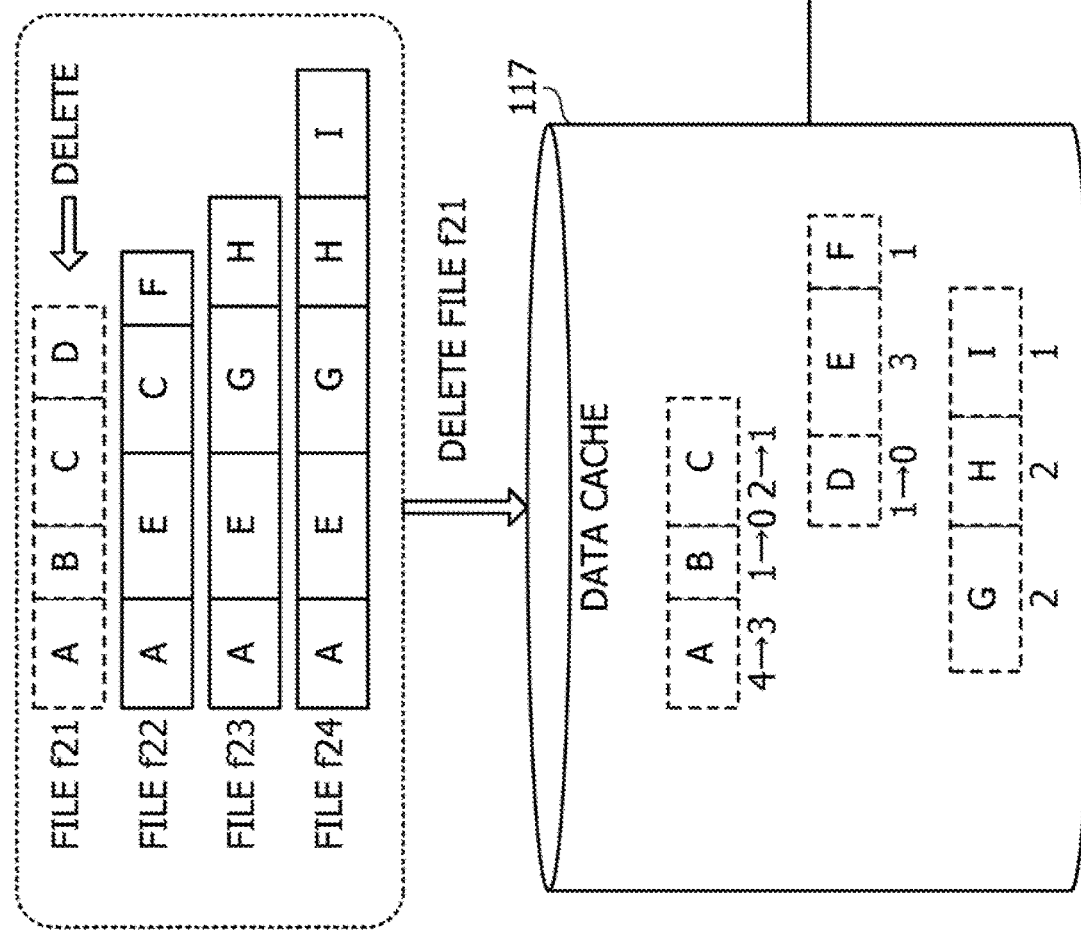
FIG. 11 is a second diagram illustrating a comparative example of the defragmentation processing procedure.

FIG. 11 is a second diagram illustrating a comparative example of the defragmentation processing procedure. In the cloud storage gateway 100, the remaining capacity of the data cache 117 becomes a predetermined amount, a less accessed object among the objects uploaded to the cloud storage 240 is deleted from the data cache 117. In FIG. 11, it is assumed that the objects ob21 to ob23 are deleted from the data cache 117.

In this state, given that deletion of the file f21 is requested from the NAS client 210. Accordingly, the number of references of the chunk A decreases from "4" to "3", the number of references of the chunk B decreases from "1" to "0", the number of references of the chunk C decreases from "2" to "1", and the number of references of the chunk D decreases from "1" to "0". This makes the chunks B, D invalid data.

Figure 12:
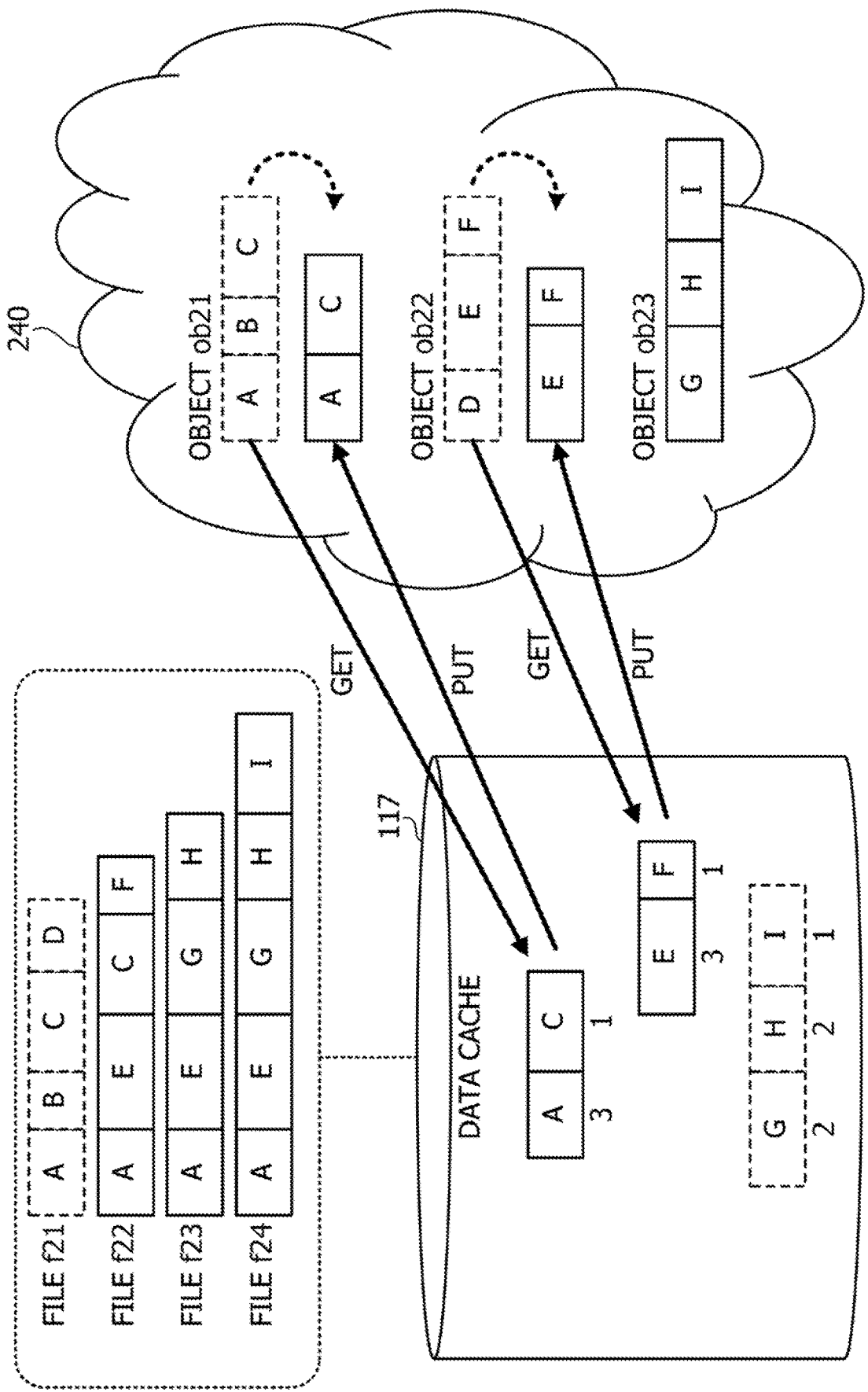
FIG. 12 is a third diagram illustrating a comparative example of the defragmentation processing procedure.

FIG. 12 is a third diagram illustrating a comparative example of the defragmentation processing procedure. FIG. 12 illustrates an example of a defragmentation processing procedure for deleting data of the invalid chunks B, D from the cloud storage 240.

In the example illustrated in FIG. 12, the object ob21 including the chunk B is acquired by the cloud storage gateway 100 according to the GET command. The chunks A, C except the chunk B reconstruct the object ob21, and the reconstructed object ob21 is re-uploaded to the cloud storage 240 according to the PUT command.

The object ob22 including the chunk D is acquired by the cloud storage gateway 100 according to the GET command. The chunks E, F except the chunk D reconstruct the object ob22, and the reconstructed object ob22 is re-uploaded to the cloud storage 240 according to the PUT command.

Figure 13:
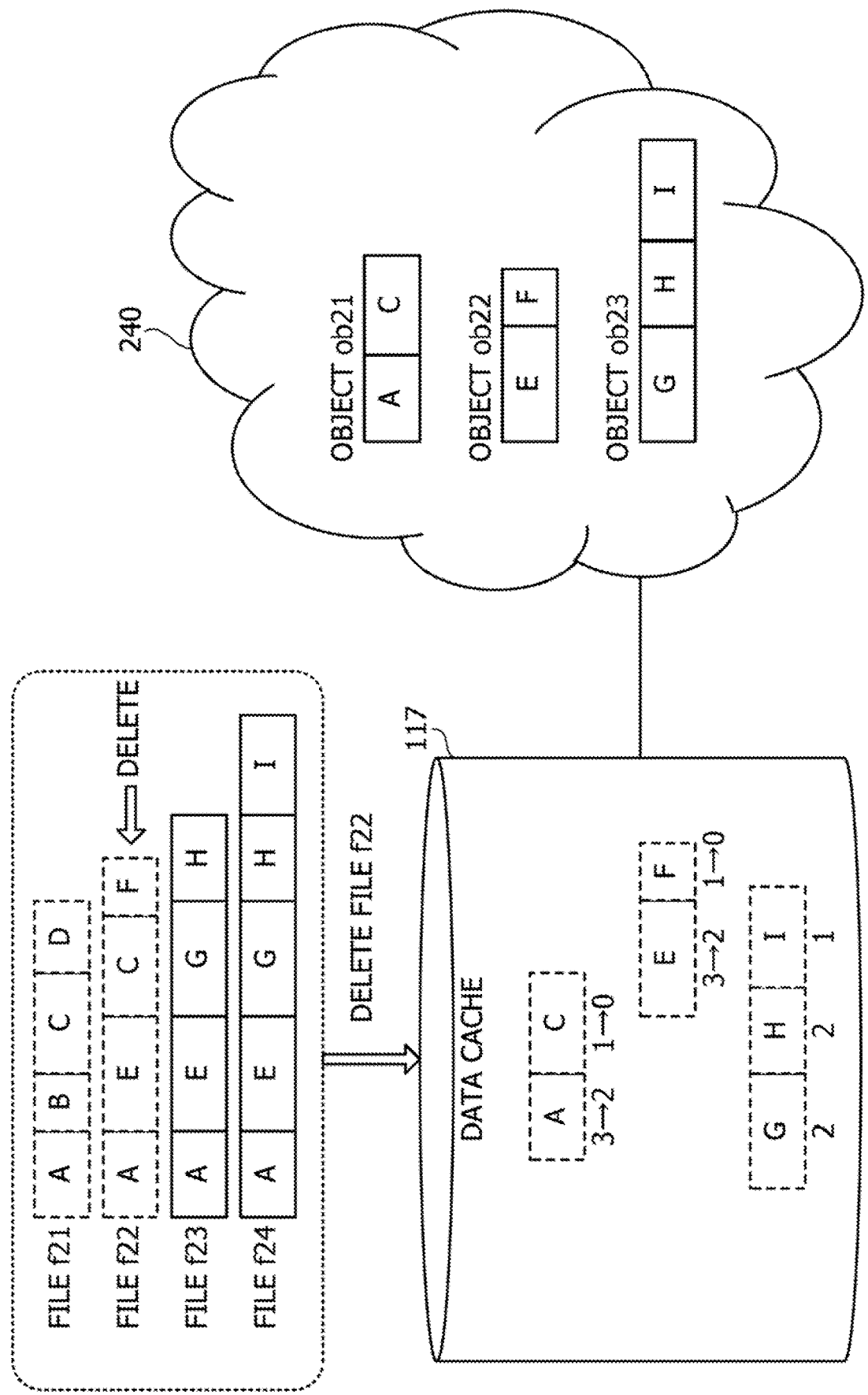
FIG. 13 is a fourth diagram illustrating a comparative example of the defragmentation processing procedure.

FIG. 13 is a fourth diagram illustrating a comparative example of the defragmentation processing procedure. In FIG. 13, with a decrease in the remaining capacity of the data cache 117, the reconstructed objects ob21, ob22 are deleted from the data cache 117.

In this state, given that deletion of the file f22 is further requested from the NAS client 210. Accordingly, the number of references of the chunk A decreases from "3" to "2", the number of references of the chunk E decreases from "3" to "2", the number of references of the chunk C decreases from "1" to "0", and the number of references of the chunk F decreases from "1" to "0". This makes the chunks C, F invalid data.

Figure 14:
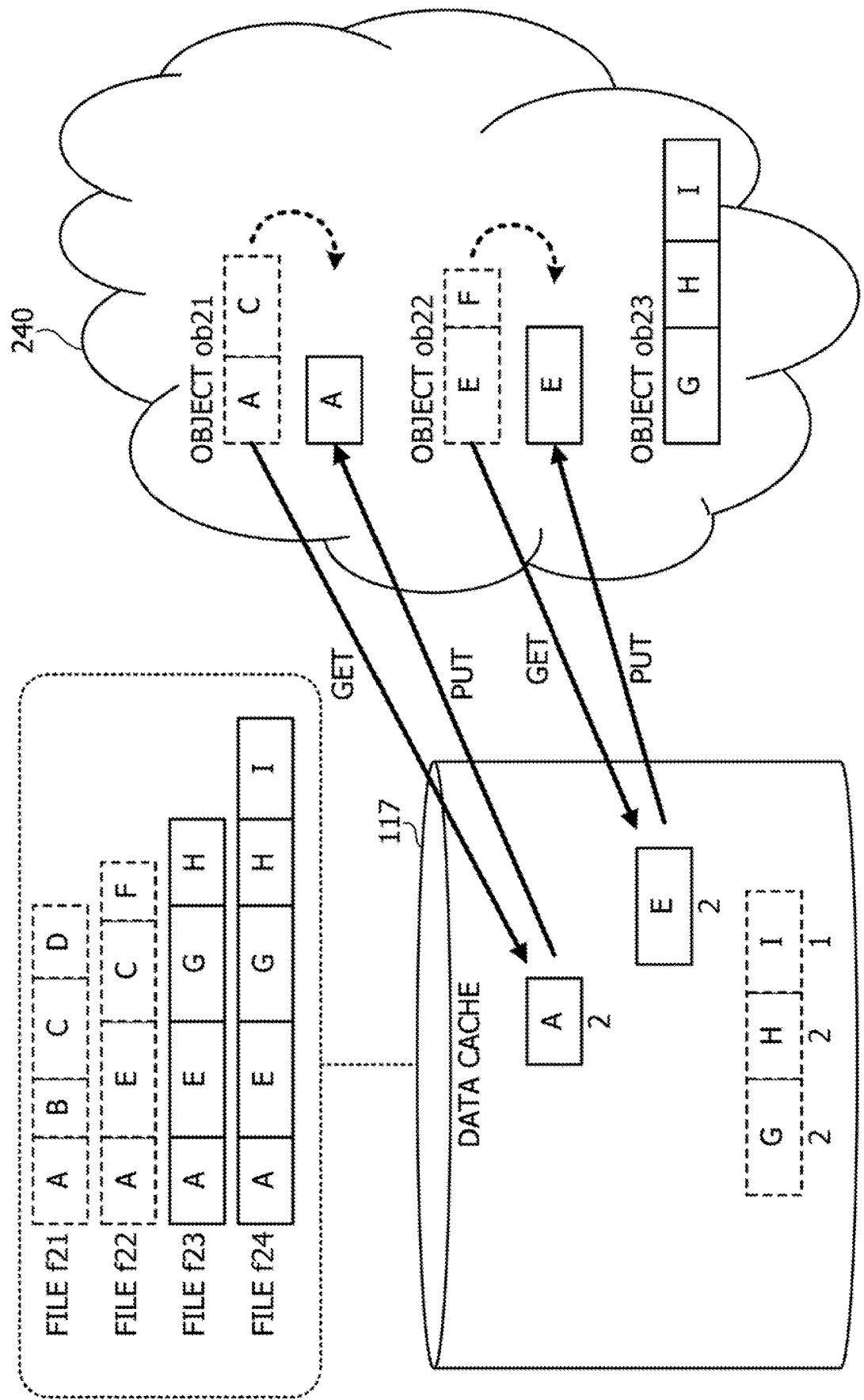
FIG. 14 is a fifth diagram illustrating a comparative example of the defragmentation processing procedure.

FIG. 14 is a fifth diagram illustrating a comparative example of the defragmentation processing procedure. FIG. 14 illustrates an example of a defragmentation processing procedure for deleting the invalid chunks C, F from the cloud storage 240.

In the example illustrated in FIG. 14, the object ob21 including the chunk C is acquired by the cloud storage gateway 100 according to the GET command. The chunk A except the chunk C reconstructs the object ob21, and the reconstructed object ob21 is re-uploaded to the cloud storage 240 according to the PUT command.

The object ob22 including the chunk F is acquired by the cloud storage gateway 100 according to the GET command. The chunk E except the chunk F reconstructs the object ob22, and the reconstructed object ob22 is re-uploaded to the cloud storage 240 according to the PUT command.

According to the above defragmentation processing procedure, the invalid chunks B, C, D, and F are deleted from the cloud storage 240 to reduce the used capacity of the cloud storage 240. However, in both of the first defragmentation processing illustrated in FIG. 12 and the second defragmentation processing illustrated in FIG. 14, the command for each object is transmitted twice, increasing the number of communications.

For simplification of description, FIG. 10 to FIG. 14 illustrate a small number of objects and a small number of chunks in the object, but in fact, several tens of thousands of objects are generated and several thousands of chunks are included in each object. Thus, a large number of objects including invalid chunks occur and moreover, invalid chunks occur in the same object multiple times. Communication is made for each object twice according to the GET command and the PUT command. Accordingly, the number of communications accompanied with defragmentation becomes enormous, resulting in enormous communication charges.

Figure 15:
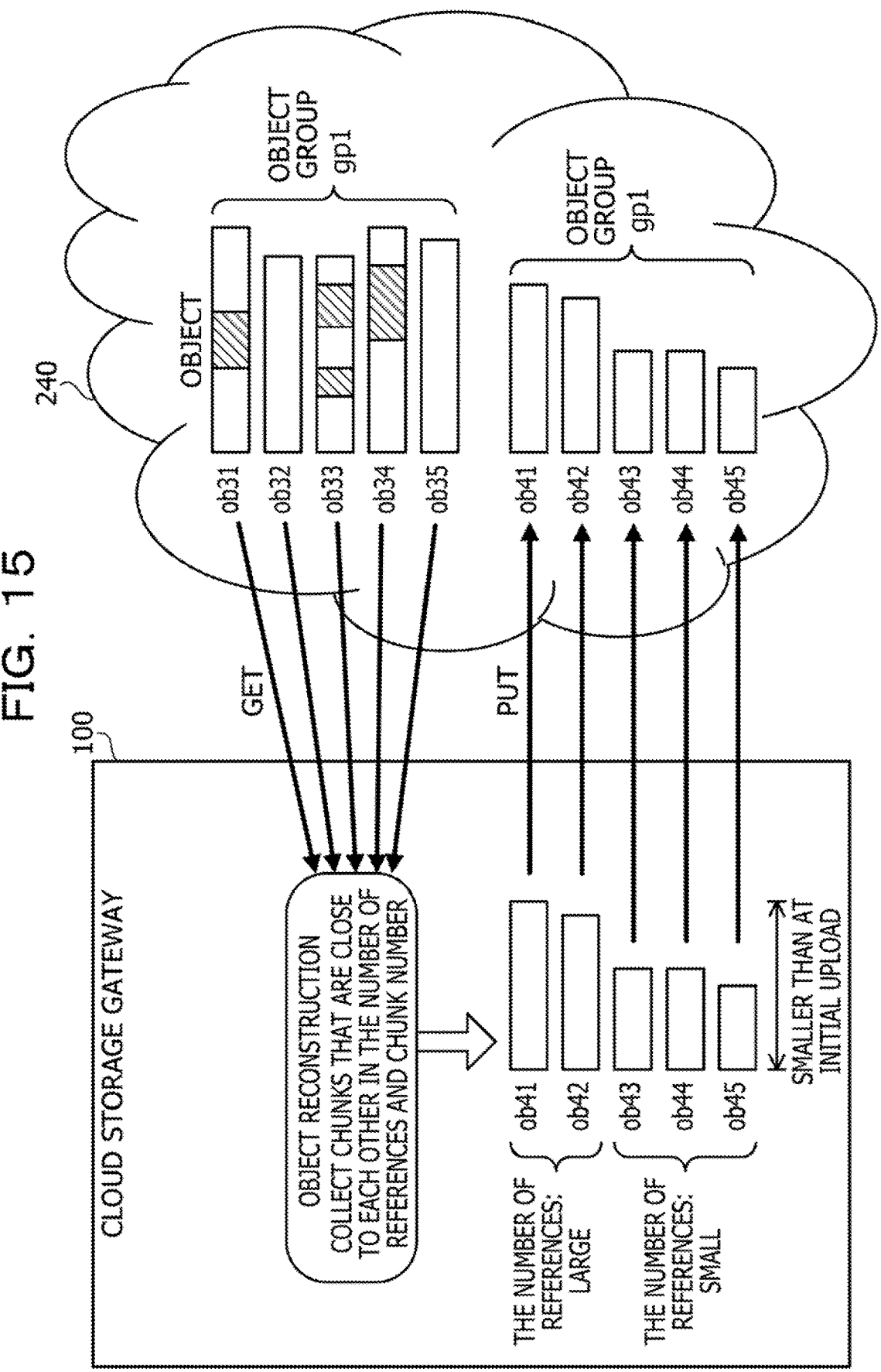
FIG. 15 is a diagram illustrating a defragmentation processing procedure according to the second embodiment.

FIG. 15 is a diagram illustrating a defragmentation processing procedure according to the second embodiment. The cloud storage gateway 100 in the present embodiment determines the necessity or unnecessity at first defragmentation of the object in units of object group including a plurality of objects rather than in units of object. The defragmentation determination table 116 illustrated in FIG. 9 is used to determine the necessity or unnecessity of defragmentation in units of object group. Using the defragmentation determination table 116, the cloud storage gateway 100 monitors the occurrence status of invalid chunks in each object included in the object group. When the ratio of the number of invalid chunks in the object group exceeds a certain ratio, the cloud storage gateway 100 determines that defragmentation of each object in the object group is to be executed.

When determining that defragmentation of a certain object group is to be executed, the cloud storage gateway 100 acquires all objects in the object group. The cloud storage gateway 100 removes the invalid chunks from all of the acquired objects to reconstruct objects, and re-uploads the reconstructed objects to the cloud storage 240. In reconstruction of the objects, the cloud storage gateway 100 recombines valid chunks between objects rather than simply combine valid chunks in the same object so as to decrease the number of occurrences of defragmentation and the number of communications in defragmentation from then on. An object to determine the necessity or unnecessity of defragmentation in units of object group as described above is to recombine valid chunks between objects in the object group.

In the example illustrated in FIG. 15, objects ob31 to ob35 are generated in response to a file write request, and uploaded to the cloud storage 240 (initial upload). These objects ob31 to ob35 form an object group gp1. It is assumed that invalid chunks occur in the object group gp1 due to file deletion or file update request, and the ratio of the number of invalid chunks exceeds a certain ratio such that defragmentation of the object group gp1 is determined to be executed. Hatched portions in the objects ob31, ob33, ob34 in FIG. 15 represent areas of the invalid chunks.

The cloud storage gateway 100 acquires the objects ob31 to ob35 from the cloud storage 240 according to the GET command, and collectively performs defragmentation of these objects. In this defragmentation, the cloud storage gateway 100 recombines the valid chunks included in the acquired objects ob31 to ob35 to reconstruct objects, and uploads the reconstructed objects to the cloud storage 240. In the example illustrated in FIG. 15, the objects ob41 to ob45 are generated by reconstruction, and are uploaded to the cloud storage 240. For example, the cloud storage 240 stores the reconstructed objects ob41 to ob45 in place of the original objects ob31 to ob35.

Similar to the original objects ob31 to ob35, the reconstructed objects ob41 to ob45 are managed as belonging to the same object group gp1. Accurately, the valid chunks in the original objects ob31 to ob35 (for example, the chunks in the reconstructed objects ob41 to ob45) are managed as still belonging to the same object group gp1 after reconstruction. Thus, in the defragmentation determination table 116 (see FIG. 9), the chunks in the reconstructed objects ob41 to ob45 are associated with the same records and managed after reconstruction.

Meanwhile, although not illustrated, the cloud storage gateway 100 executes the second and subsequent defragmentation of the object group gp1 in units of object rather than in unit of object groups. For example, for the reconstructed objects ob41 to ob45, the number of invalid chunks is monitored in units of object, and the object in which the ratio of the number of invalid chunks exceeds a certain ratio is subjected to the second defragmentation. According to the defragmentation, as illustrated in FIG. 12 and FIG. 14, only valid chunks in a single object are combined to reconstruct an object.

According to the first defragmentation of the object group gp1, in reconstructing the object, the number of references and the chunk number that correspond to valid chunks, which are registered in the chunk management table 113, are referred. The cloud storage gateway 100 basically collects chunks that are close to each other in the number of references and the chunk number in the same object.

The chunks that are close to each other in the chunk number are likely to be taken out from the same file. When a file is written from the NAS client 210 for back-up, write or deletion for a plurality of files are often requested. For this reason, by collecting chunks that are close to each other in chunk number in one object and re-uploading the object, it is highly likely that the number of references of chunks in the object decreases at the same time. By collecting chunks that are close to each other in the number of references in one object, it is highly likely that the number of references of chunks in the object uniformly decreases.

As a result, it is less likely that invalid chunks gradually occur at dispersed locations in the object over time and conversely, a lot of invalid chunks tend to occur in the object at one time. Thus, when it is determined that defragmentation of the object is to be executed, the possibility that a lot of invalid chunks may be deleted increases. Consequently, as compared to the case where invalid chunks gradually increase in the object over time, the possibility that the number of times of defragmentation of the same object decreases. Thus, the possibility that the number of communications between the cloud storage gateway 100 and the cloud storage 240 decreases. The decrease in the number of communications also reduces traffic between the cloud storage gateway 100 and the cloud storage 240.

Figure 16:
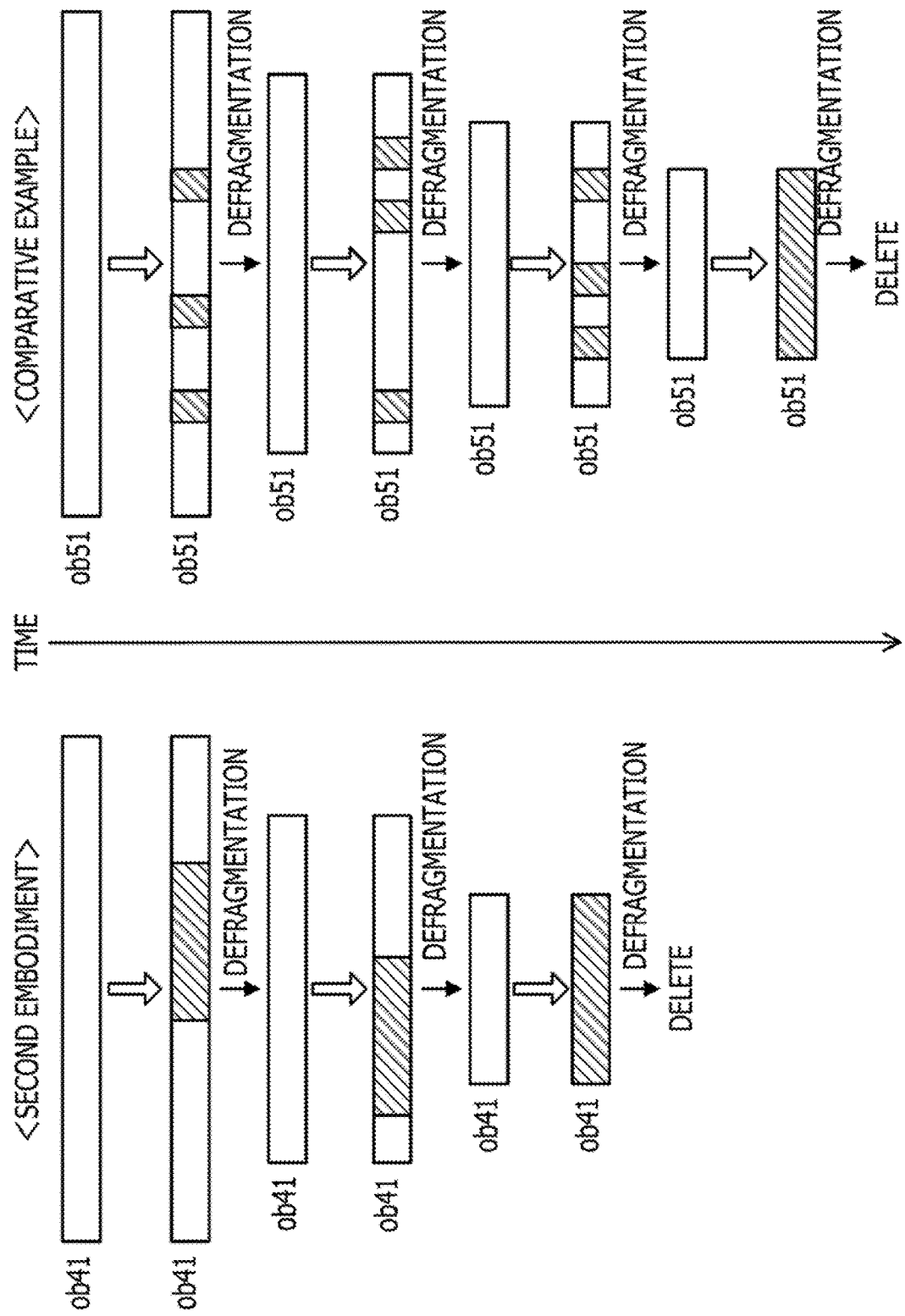
FIG. 16 is a first diagram illustrating an execution example of the second or subsequent defragmentation.

FIG. 16 is a first diagram illustrating an execution example of the second or subsequent defragmentation. A left side in FIG. 16 illustrates an example of the state transition of the object ob41 reconstructed in FIG. 15. A right side in FIG. 16 illustrates, as a comparative example of the state transition, an example of the state transition of an object ob51 acquired by combining only valid chunks in the original object ob31.

In the object ob41, invalid chunks tend to occur in a large area. In the object ob51, even when the number of references of chunks in a large area decreases, the number of references varies depending on the chunks and thus, invalid chunks easily occur in small dispersed areas. As a result, in the object ob41, it is highly likely that the number of invalid chunks deleted when determined that defragmentation is to be executed becomes large. Consequently, in the object ob41, it is highly likely that the number of times of defragmentation performed until the entire object is deleted decreases.

Hereinafter, the description is continued by using FIG. 15. In the case where the possibility that the number of references of chunks in the object uniformly decreases is high, as the size of the object is smaller, the possibility that all of the chunks in the object become invalid when determined that defragmentation of the object is to be executed becomes higher. Thus, in the cloud storage gateway 100, at the first defragmentation of the object group gp1, as the number of references of the object is smaller, the size of the object is made smaller (the number of chunks included in the object is made smaller). In this manner, when it is determined that defragmentation of the object is to be executed, in the case where all chunks in the object are invalid, only deletion (DELETE) of the object is requested and acquisition (GET) and re-upload (PUT) of the object are not requested. This increases the possibility that the number of communications between the cloud storage gateway 100 and the cloud storage 240 is further decreased. Due to the decrease in the number of communications, further decrease in traffic between the cloud storage gateway 100 and the cloud storage 240 may be expected.

In the example illustrated in FIG. 15, the number of references of the chunks included in the reconstructed objects ob41, ob42 is smaller than the number of references of the chunks included in the reconstructed objects ob43 to ob45. The size of the objects ob41, ob42 is made smaller than the size of the objects ob43 to ob45. Thus, the objects ob43 to ob45 are deleted in units of object according to the DELETE command more easily than the objects ob41, ob42. As a result, when it is determined that defragmentation is to be executed, it is highly likely that the objects ob43 to ob45 may further reduce the number of communications. The chunks in the entire object are deleted, thereby reducing processing load applied to the cloud storage gateway 100 without reconstructing the object.

Figure 17:
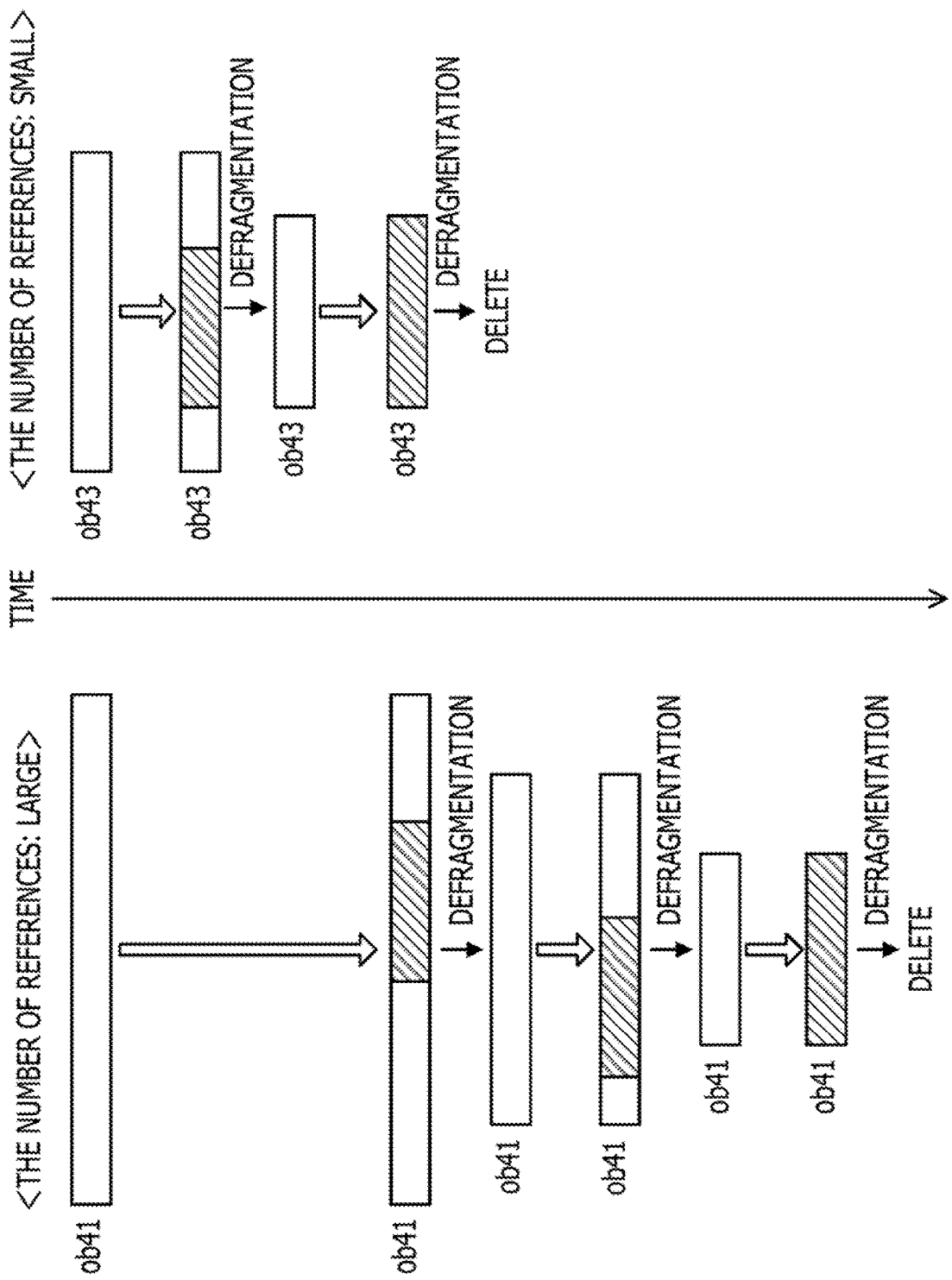
FIG. 17 is a second diagram illustrating an execution example of the second or subsequent defragmentation.

FIG. 17 is a second diagram illustrating an execution example of the second or subsequent defragmentation. A left side in FIG. 17 illustrates an example of the state transition of the object ob41 reconstructed in FIG. 15. A right side in FIG. 17 illustrates an example of the state transition of the object ob43 reconstructed in FIG. 15. As described above, the number of references of the chunks included in the reconstructed objects ob41 is smaller than the number of references of the chunks included in the reconstructed objects ob43. The size of the object ob41 is smaller than the size of the object ob43.

In any of the objects ob41, ob43, it is highly likely that the number of references of the chunks in the object uniformly decreases. In addition, in any of the objects ob41, ob43, it is highly likely that the number of invalid chunks deleted when determined that defragmentation is to be executed becomes large. However, since the number of references of the chunks included in the object ob43 is smaller, all chunks in the object ob43 tend to become invalid earlier. The possibility that all chunks in the object ob43 becomes invalid at one time is high. The possibility that the object ob43 may further reduce the number of communications between the cloud storage gateway 100 and the cloud storage 240 becomes high.

Hereinafter, the description is continued by using FIG. 15. In the cloud storage gateway 100, the size of the object generated at the first defragmentation of the object may be smaller than the size of the object generated at the initial upload. This is performed based on the following characteristic of the cloud storage 240.

As the size of the object is larger, communication performances between the cloud storage gateway 100 and the cloud storage 240 may be improved. This is due to that data of the same size may be transmitted in one object once at a higher communication rate than in a plurality of divided objects multiple times.

In this embodiment, the initial upload is performed as a series of processing executed in response to file write or file update request from the NAS client 210. For example, until upload of object to be used is completed, a response to the file write or file update is not returned to the NAS client 210. For this reason, initial upload is to be performed at high speed. Thus, at initial upload, for example, a relatively large object of about 50 MB on average is generated, and the object is transmitted to the cloud storage 240. This may reduce response time for file write and file update.

Meanwhile, defragmentation is performed in the background while the I/O (Input/Output) processing is executed in response to the request from the NAS client 210. For this reason, the communication rate in defragmentation is not necessarily high as in initial upload. Thus, the size of the object generated at the first defragmentation of the object may be made smaller than the size of the object generated at initial upload. For example, the number of references of the chunk is large, the size of the object is set to be a few MB on average, and the number of references of the chunk is small, the size of the object is set to be about 1 MB on average. By decreasing the size of the object in this manner, data traffic in the second or subsequent defragmentation may be reduced.

Figure 18:
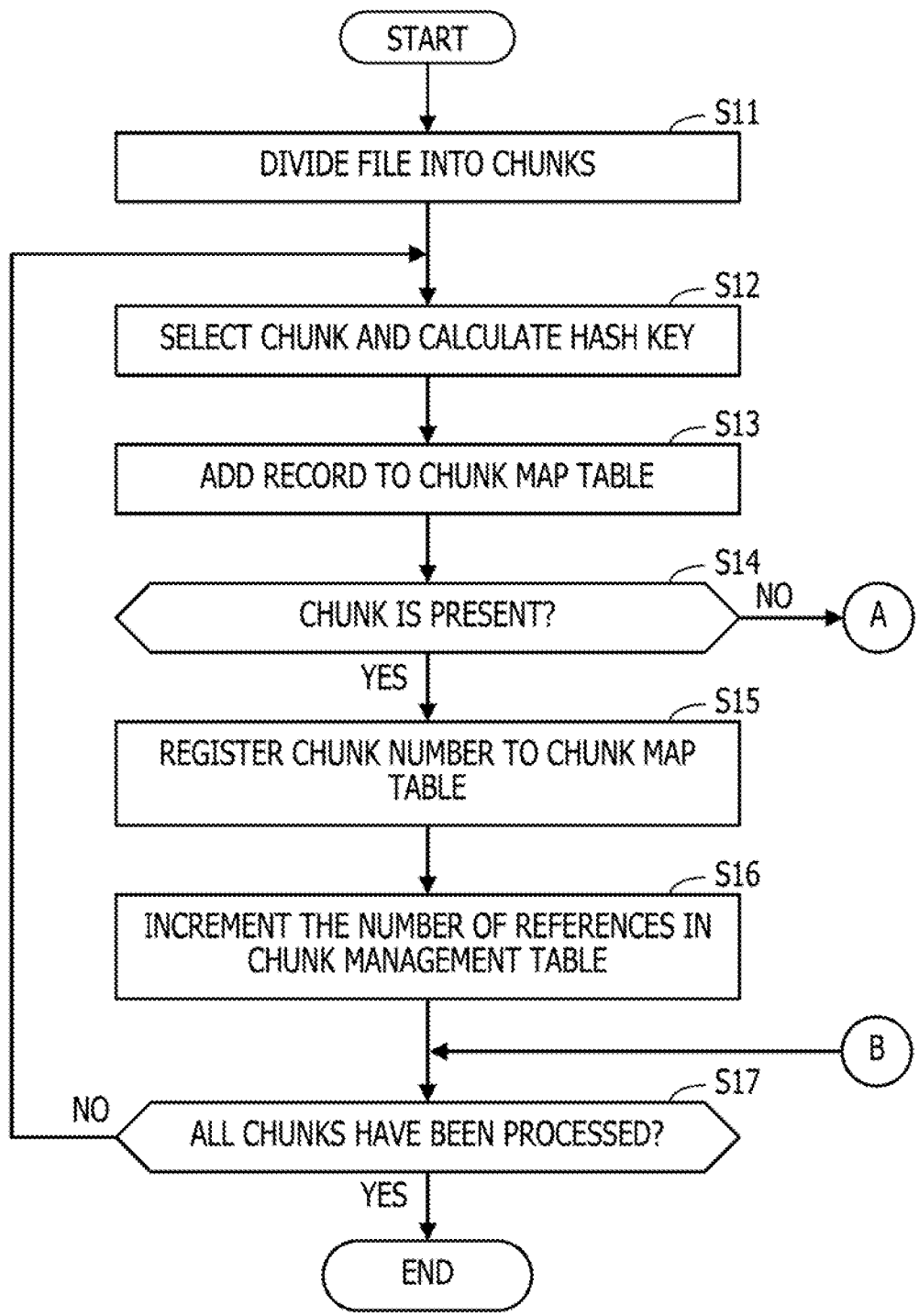
FIG. 18 is an exemplary flowchart (1) illustrating a file write processing procedure.
Figure 19:
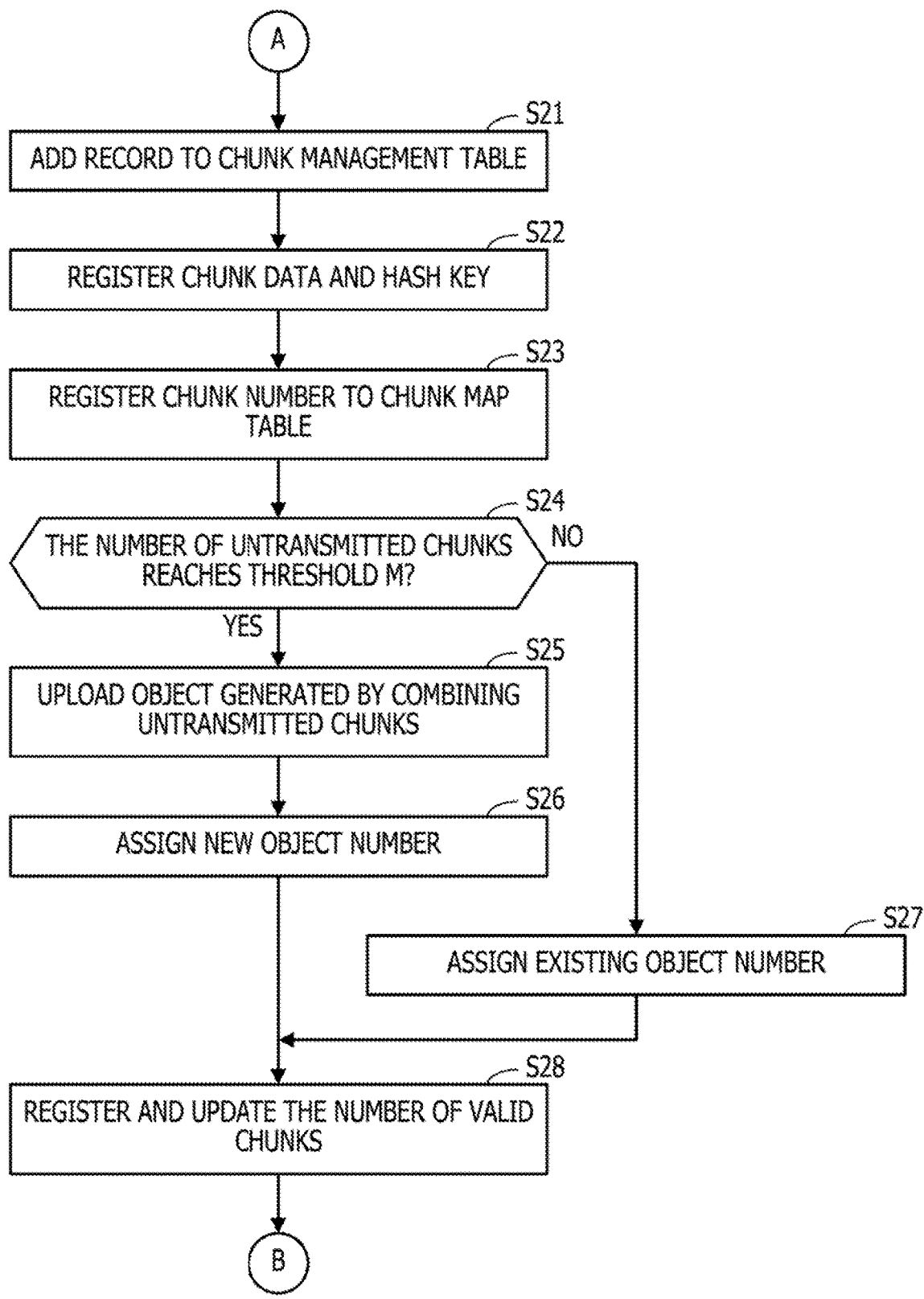
FIG. 19 is an exemplary flowchart (2) illustrating the file write processing procedure.

Next, processing of the cloud storage gateway 100 will be described using a flowchart. FIG. 18 and FIG. 19 are flowcharts illustrating an example of a file write processing procedure.

[Step S11] The file input/output unit 120 receives a file write request and file data from the NAS client 210. The duplication determination unit 131 of the deduplication processing unit 130 acquires data of the file for which the write request is made, and adds a record indicating directory information of the file to the directory table 111. At this time, a file number is added to the file. The duplication determination unit 131 divides the file data into chunks of variable length.

[Step S12] The duplication determination unit 131 selects one chunk to be processed in the order from the start of a file. The duplication determination unit 131 calculates the hash key based on data of the selected chunk.

[Step S13] The duplication determination unit 131 adds a record to the chunk map table 112, and registers the following information in the record. The file number of the file for which the write request is made is registered in the item of file number, and information about the chunk to be processed is registered in the items of offset and size.

[Step S14] The duplication determination unit 131 refers to the hash key table 114, and determines whether or not the record that registers the hash key calculated in Step S13 is present. This may determine whether or not the chunk having the same contents as the chunk selected in Step S12 has been stored (redundant). The duplication determination unit 131 executes the processing in Step S15 when the concerned record is found, and executes the processing in Step S21 in FIG. 19 when the concerned record is not present.

[Step S15] The duplication determination unit 131 acquires the record searched from the hash key table 114 in Step S14 to acquire the chunk number, and registers the acquired chunk number in the record added to the chunk map table 112 in Step S13.

[Step S16] The duplication determination unit 131 refers to the record containing the chunk number acquired in Step S15 among records in the chunk management table 113, and increments the number of references registered in the record.

[Step S17] The duplication determination unit 131 determines whether or not all chunks divided in Step S11 have been processed. The duplication determination unit 131 moves the processing to Step S12 when any unprocessed chunk is present, and selects one unprocessed chunk from the start and continues the processing. On the contrary, when all chunks have been processed, the duplication determination unit 131 notifies the file input/output unit 120 of completion of file write. The notified file input/output unit 120 transmits response information indicating the completion of file write to the NAS client 210.

The description continues below by using FIG. 19.

[Step S21] The duplication determination unit 131 calculates a new chunk number for the chunk selected in Step S12. This chunk number is a value obtained by adding "1" to a maximum value of the chunk number registered in the chunk management table 113. The duplication determination unit 131 adds a new record to the chunk management table 113, and registers the calculated new chunk number, chunk size, and the number of references "1" in the record.

[Step S22] The duplication determination unit 131 stores data of the chunk selected in Step S12 in the data cache 117. At this time, the data storage position is associated with the chunk number. The duplication determination unit 131 also adds a new record to the hash key table 114, and registers the new chunk number calculated in Step S21 and the hash key calculated in Step S12 in the record.

[Step S23] The duplication determination unit 131 registers the new chunk number calculated in Step S21 in the record added to the chunk map table 112 in Step S13.

[Step S24] The chunk management unit 132 determines whether or not the number of chunks untransmitted to the cloud storage 240 reaches a predetermined threshold (M). The number of untransmitted chunks is the number of chunks included in the active object. The threshold M is set to, for example, about 10000. The chunk management unit 132 moves the processing to Step S25 when the number of untransmitted chunks reaches the threshold M, and moves the processing to Step S27 when the number of untransmitted chunks does not reach the threshold M.

[Step S25] The chunk management unit 132 requests the cloud communication unit 140 to upload the object generated by combining M untransmitted chunks to the cloud storage 240. Thereby, the concerned object is made inactive. The cloud communication unit 140 uploads the object to the cloud storage 240 according to the PUT command.

[Step S26] The chunk management unit 132 assigns a new object number to the chunk selected in Step S12. This object number is a value obtained by adding "1" to the object number of the object uploaded in Step S25. The chunk management unit 132 registers the new object number and the offset "0" in the record added to the chunk management table 113 in Step S21. The object corresponding to the new object number is made active. The chunk management unit 132 adds a new record to the object management table 115, and registers the new object number in this record.

[Step S27] The chunk management unit 132 assigns the existing maximum object number to the chunk selected in Step S12. This object number is the object number assigned to the untransmitted chunks to be determined in Step S24. In Step S27, the chunk selected in Step S12 is further assigned to the untransmitted object assigned to these chunks (active object).

The chunk management unit 132 registers the assigned object number and the offset in the corresponding object in the record added to the chunk management table 113 in Step S21. The registered offset is calculated based on the offset and size that are registered in the previous record.

[Step S28] The chunk management unit 132 registers or updates the number of valid chunks in the object management table 115 and the defragmentation determination table 116.

Upon completion of Step S26, the chunk management unit 132 registers M as the number of valid chunks in the record added to the object management table 115 in Step S26. The chunk management unit 132 identifies the record corresponding to the object group including the object corresponding to the record from the defragmentation determination table 116, and adds M to the number of valid chunks registered in the identified record. However, when the concerned object group is not present in the defragmentation determination table 116, the chunk management unit 132 adds a new record to the defragmentation determination table 116, and registers M as the number of valid chunks and "0" as the defragmentation completion flag in the added record.

On the contrary, when Step S27 is performed, the chunk management unit 132 identifies the record including the object number assigned to the object management table 115 in Step S27, and adds M to the number of valid chunks registered in the identified record. The chunk management unit 132 identifies the record corresponding to the object group including the object corresponding to the record from the defragmentation determination table 116, and adds M to the number of valid chunks registered in the identified record.

Upon completion of the above processing in Step S28, the processing proceeds to Step S17 in FIG. 18.

Figure 20:
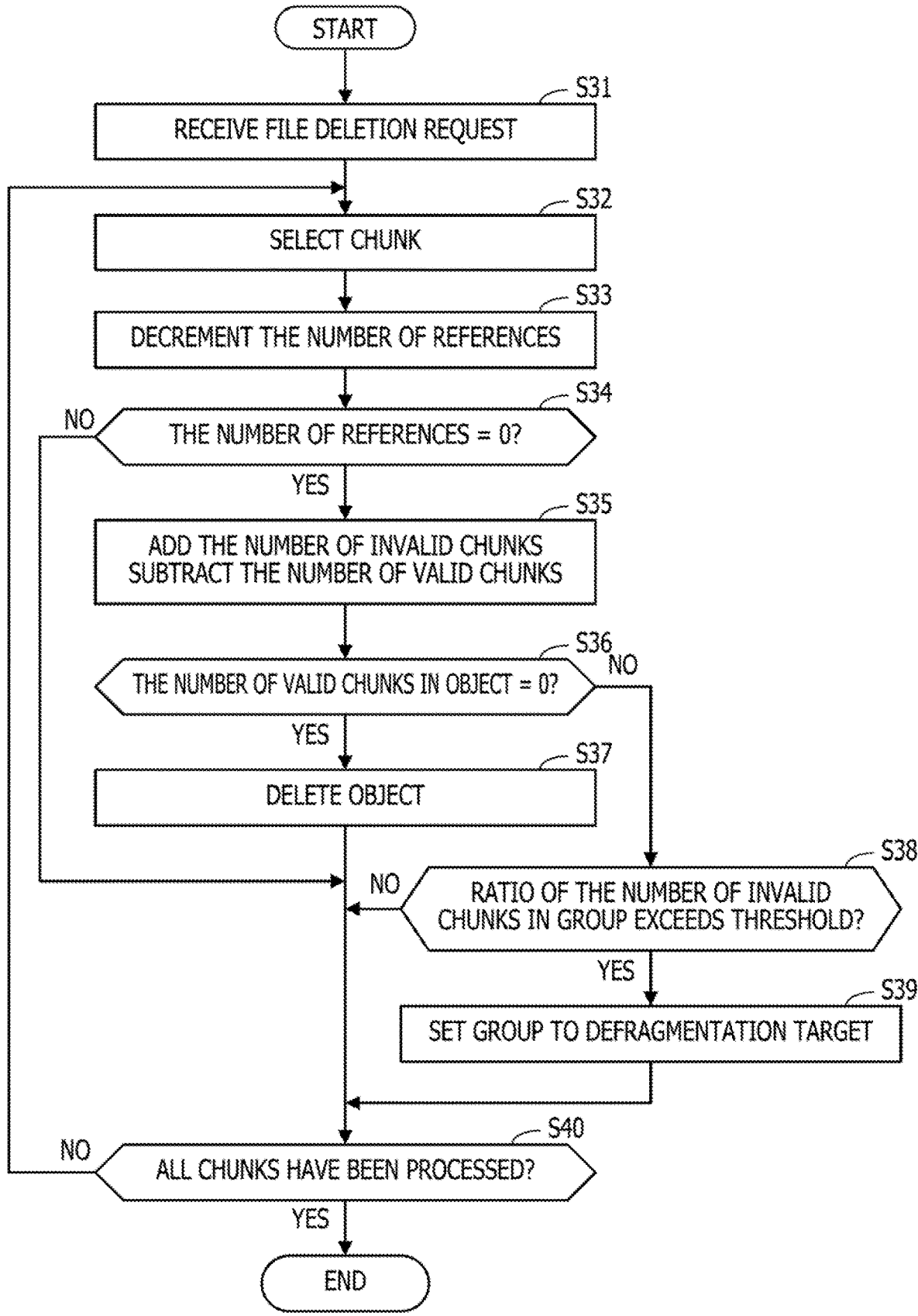
FIG. 20 is an exemplary flowchart (2) illustrating a file deletion processing procedure.

FIG. 20 is a flowchart illustrating an example of a file deletion processing.

[Step S31] The file input/output unit 120 receives a file deletion request from the NAS client 210. The duplication determination unit 131 of the deduplication processing unit 130 identifies the file number of a file for which the delete request is made by using the directory table 111.

[Step S32] The duplication determination unit 131 identifies the record in which the identified file number is registered in Step S31 from the chunk map table 112, and selects one identified record. In this manner, one chunk generated from the file for which the delete request is made is selected.

[Step S33] The duplication determination unit 131 acquires the chunk number from the record selected in Step S32. The duplication determination unit 131 decrements the number of references associated with the acquired chunk number by "1" in the chunk management table 113.

[Step S34] The duplication determination unit 131 determines whether or not the decremented number of references is "0". The duplication determination unit 131 moves the processing to Step S35 when the number of references is "0", and moves processing to Step S40 when the number of references is not "0" ("1" or more).

[Step S35] In this case, the chunk corresponding to the chunk number acquired in Step S33 is invalid. The chunk management unit 132 identifies the object number associated with the chunk number acquired in Step S33, from the chunk management table 113. The chunk management unit 132 refers to the object management table 115, adds "1" to the number of invalid chunks associated with the identified object number, and subtracts "1" from the number of valid chunks associated with the concerned object number.

The chunk management unit 132 identifies the object group including the object indicated by the identified object number, and identifies the record corresponding to the identified object group from the defragmentation determination table 116. The chunk management unit 132 adds "1" to the number of invalid chunks registered in the identified record, and subtracts "1" from the number of valid chunks registered in the concerned record.

[Step S36] The chunk management unit 132 determines whether or not the number of valid chunks registered in the concerned record in the object management table 115 has become "0" as a result of the subtraction from the number of valid chunks in Step S35. The chunk management unit 132 moves the processing to Step S37 when the number of valid chunks is "0", and moves the processing to Step S38 when the number of valid chunks is not "0" ("1" or more).

[Step S37] In this case, all chunks in the object to which the chunk corresponding to the chunk number acquired in Step S33 are invalid. For this reason, this object is unnecessary. Thus, the chunk management unit 132 requests the cloud communication unit 140 to delete this object. The cloud communication unit 140 requests the cloud storage 240 to delete the object according to the DELETE command. Thus, the object is deleted from the cloud storage 240.

[Step S38] The chunk management unit 132 refers to the record in the defragmentation determination table 116, in which the number of valid chunks and the number of invalid chunks are updated in Step S35. The chunk management unit 132 calculates the ratio of the number of invalid chunks to the total number of chunks (the number of valid chunks+ the number of invalid chunks) based on the number of valid chunks and the number of invalid chunks that are registered in the records. The ratio of the number of invalid chunks indicates the ratio of the number of invalid chunks to the total number of chunks in the object group to which the object including the chunk corresponding to the chunk number acquired in Step S33 belongs.

The chunk management unit 132 determines whether or not the ratio of the number of invalid chunks exceeds a predetermined threshold (for example, 20%). The chunk management unit 132 moves the processing to Step S39 when the ratio of the number of invalid chunks exceeds the threshold, and moves the processing to Step S40 when the ratio of the number of invalid chunks is the threshold or less.

[Step S39] When the ratio of the number of invalid chunks exceeds the threshold in Step S38, it is determined that the data reduction effect by defragmentation is high for the object group to which the chunk corresponding to the chunk number acquired in Step S33 belongs (the object group corresponding to the record referred in Step S38). In this case, the chunk management unit 132 sets this object group to a defragmentation target. At this time, for example, the current time (time set to the defragmentation target) Is added to the concerned object group.

[Step S40] The duplication determination unit 131 determines whether or not chunks corresponding to all records identified in Step S32 (for example, all chunks generated from a file for which the delete request is made) have been processed. The duplication determination unit 131 moves the processing to Step S32 when any unprocessed chunk is present, selects one unprocessed chunk and continues the processing. On the contrary, the duplication determination unit 131 notifies the file input/output unit 120 of the completion of file deletion when all chunks have been processed. The notified file input/output unit 120 transmits response information indicating the completion of file deletion to the NAS client 210.

Figure 21:
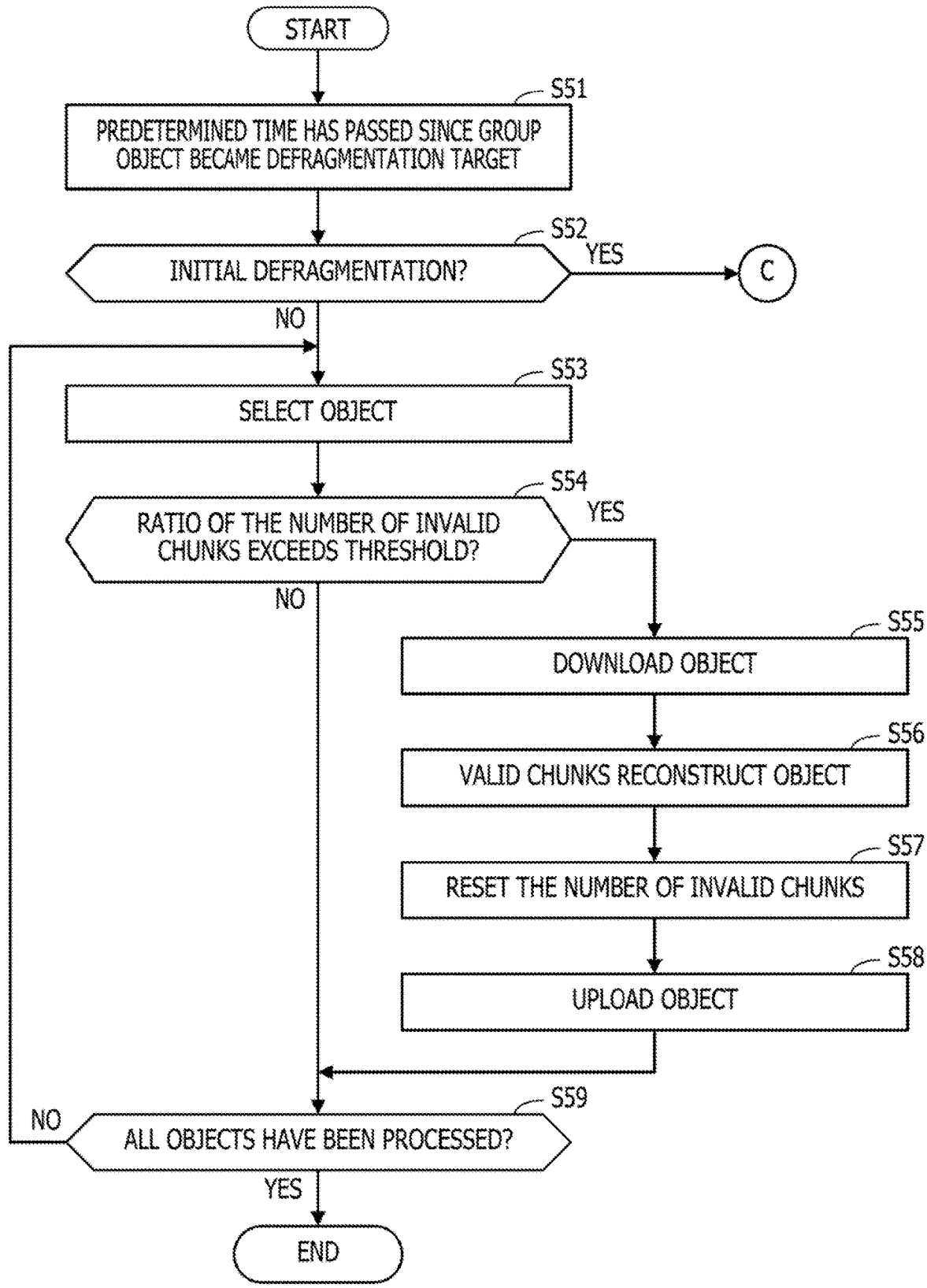
FIG. 21 is an exemplary flowchart (1) illustrating a defragmentation processing procedure.
Figure 22:
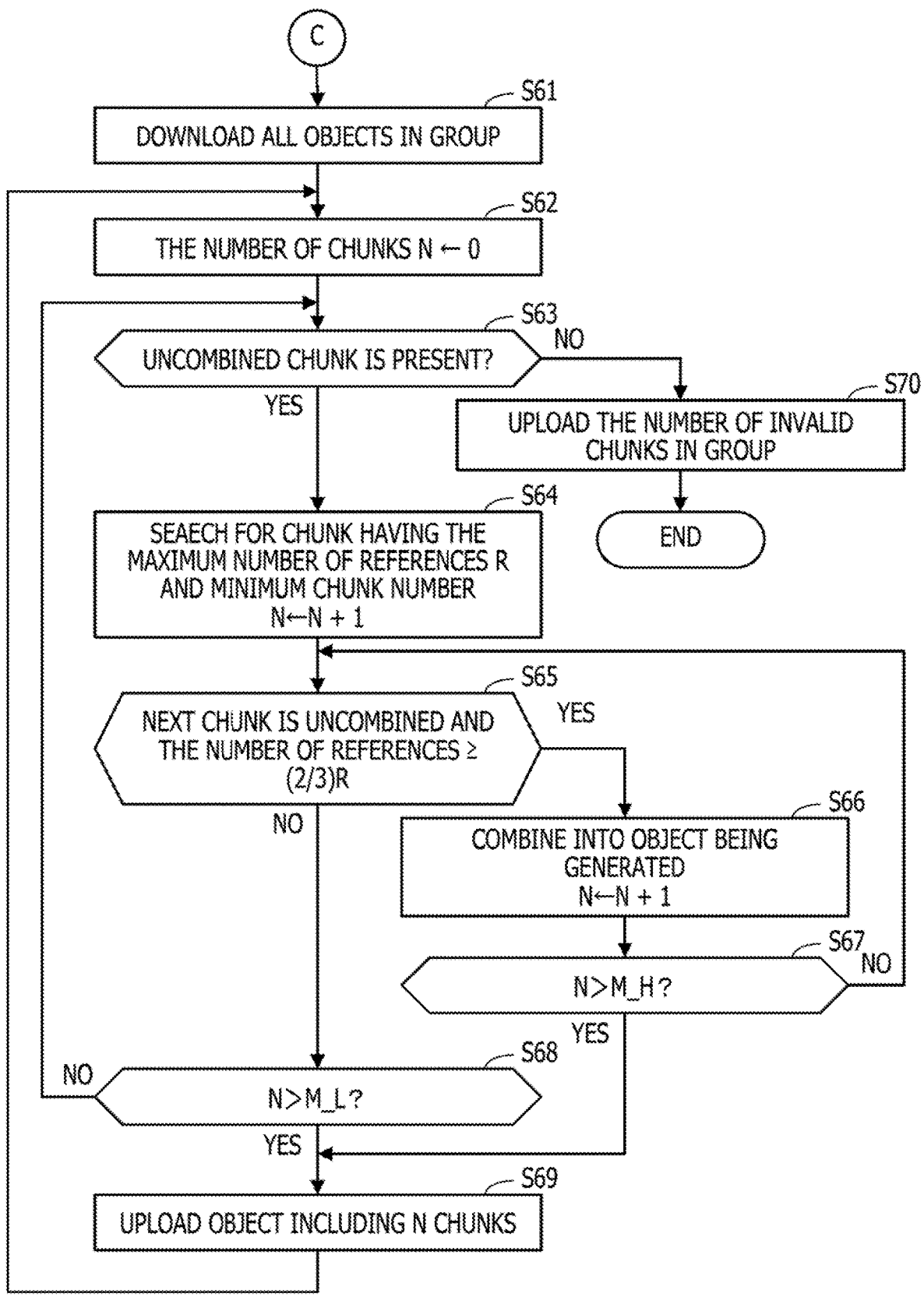
FIG. 22 is an exemplary flowchart (2) illustrating the defragmentation processing procedure.

FIG. 21 and FIG. 22 are flowcharts illustrating an example of a defragmentation processing procedure.

[Step S51] The defragmentation processing unit 133 of the deduplication processing unit 130 waits for a certain time since one object group is set to the defragmentation target by the processing in Step S39 in FIG. 20 has been set. After an elapse of the certain time, the defragmentation processing unit 133 sets the concerned object group as the processing target and moves the processing to Step S52.

In actual processing, for example, based on a time added to the object group set as the defragmentation target (the record in the defragmentation determination table 116) (time set to the defragmentation target), when detecting the object group that has elapsed for the certain time from the added time, the defragmentation processing unit 133 executes processing in Step S52 and subsequent steps.

The reason why defragmentation is performed after an elapse of the certain time rather than immediately after setting of the object group to the defragmentation target is as follows. In back-up processing in the NAS client 210, in many cases, a plurality of related files are collectively deleted. For this reason, while the certain time has elapsed from the setting of the object group to the defragmentation target, more invalid chunks are expected to occur in the same object group. In defragmentation of the object group, more invalid chunks may reduce the used capacity of the cloud storage 240 more efficiently. For example, in the processing in Step S53 and subsequent steps (the second or subsequent defragmentation), as the number of invalid chunks increases, the possibility that all chunks included in one object become invalid increases, such that the number of communications and traffic accompanied with defragmentation of the object may be reduced.

[Step S52] The defragmentation processing unit 133 determines whether or not this defragmentation is initial defragmentation for the object group to be processed. In the record corresponding to the object group to be processed among the records in the defragmentation determination table 116, this defragmentation is determined to be the when the defragmentation completion flag is "0", and this defragmentation is determined to be the second or subsequent defragmentation when the defragmentation completion flag is "1". The defragmentation processing unit 133 moves processing to Step S61 in FIG. 22 when this defragmentation is initial defragmentation, and moves the processing to Step S53 when this defragmentation is not initial defragmentation.

The description continues below by using FIG. 22. In initial defragmentation, processing in Step S61 and subsequent steps is executed.

[Step S61] The defragmentation processing unit 133 requests the cloud communication unit 140 to acquire all objects belonging to the object group to be processed. The cloud communication unit 140 downloads all of the concerned objects from the cloud storage 240 according to the GET command.

[Step S62] The defragmentation processing unit 133 resets a variable N (the number of chunks N) indicating the number of chunks combined into a new object to "0". This initiate generation (reconstruction) of one new object.

[Step S63] The defragmentation processing unit 133 determines whether or not any uncombined chunk is present among valid chunks included in each object in the object group acquired in Step S61. The "uncombined chunk" refers to a valid chunk that is not combined with both the new object being generated and the generated (completed) new object, among concerned valid chunks. The defragmentation processing unit 133 moves the processing to Step S64 when any uncombined chunk is present, and moves the processing to Step S70 when any uncombined chunk is not present.

[Step S64] Based on the chunk management table 113, the defragmentation processing unit 133 searches for the valid chunk having the maximum number of references and the minimum chunk number among uncombined valid chunks. The number of references of the chunk searched in the processing is defined as N. The defragmentation processing unit 133 adds "1" to the number of chunks N.

[Step S65] The defragmentation processing unit 133 identifies following valid chunk from valid chunks included in each object in the object group acquired in Step S61. When performed following Step S64, the valid chunk next to the valid chunk searched in Step S64 (the valid chunk having the second largest chunk number) is identified. When performed following Steps S66, S67, the valid chunk next to the valid chunk combined into the object in Step S66 is identified.

The defragmentation processing unit 133 determines whether or not the number of references of the identified valid chunk is (2/3)R or more based on the concerned record in the chunk management table 113. The defragmentation processing unit 133 moves the processing to Step S66 when the number of references is (2/3)R or more, and moves the processing to Step S68 when the number of references is smaller than (2/3)R. The coefficient "2/3" is merely an example. In Step S65, it may be determined whether or not the number of references of the identified valid chunk is a value close to R.

[Step S66] The defragmentation processing unit 133 combines the valid chunk identified in Step S65 into the new object being generated. The defragmentation processing unit 133 adds "1" to the number of chunks N.

[Step S67] The defragmentation processing unit 133 determines whether or not the number of chunks N is larger than a predetermined threshold M_H. The threshold M_H is larger than the threshold M used to generate the object for initial upload (see Step S24 in FIG. 19) and is smaller than a threshold M_L used in Step S68 described below. The defragmentation processing unit 133 moves the processing to Step S69 when the number of chunks N is larger than the threshold M_H, and moves the processing to Step S65 when the number of chunks N is the threshold M_H or less.

[Step S68] The defragmentation processing unit 133 determines whether or not the number of chunks N is larger than the predetermined threshold M_L. As described above, the threshold M_L is smaller than the threshold M_H used in Step S66. The defragmentation processing unit 133 moves the processing to Step S69 when the number of chunks N is larger than the threshold M_L, and moves the processing to Step S63 when the number of chunks N is the threshold M_L or less.

When the processing proceeds to Step S63, in Steps S63, S64, valid chunks including the start valid chunk identified in Step S65 among valid chunks included in each object in the object group acquired in Step S61 are chunks to be processed. The chunk identified in Step S65 is not combined with the new object being generated and remains as an uncombined chunk.

[Step S69] The defragmentation processing unit 133 completes generation of a new object including N valid chunks, which is being generated. The defragmentation processing unit 133 assigns a new object number to the generated (completed) new object, designates the object number and requests the cloud communication unit 140 to upload the new object. The cloud communication unit 140 uploads this new object to the cloud storage 240 according to the PUT command (re-upload).

The defragmentation processing unit 133 adds a record corresponding to the generated new object to the object management table 115. The defragmentation processing unit 133 registers, in the record, the object number, the number of chunks included in the new object as the number of valid chunks, and "0" as the number of invalid chunks.

The defragmentation processing unit 133 further updates the object number and the offset in the record corresponding to each chunk included in the generated new object among records in the chunk management table 113. In this manner, correspondence between the chunk number of each chunk and the new object is registered in the chunk management table 113.

Upon completion of Step S69, the processing proceeds to Step S62 to initiate generation of another new object.

[Step S70] The defragmentation processing unit 133 identifies a record corresponding to the object group to be processed from the defragmentation determination table 116. The defragmentation processing unit 133 subtracts the number of invalid chunks included in the object downloaded in Step S61 from the number of invalid chunks registered in the identified record. The defragmentation processing unit 133 deletes the chunk number of these invalid chunks from the item of chunk number in the identified record. The defragmentation processing unit 133 requests the cloud communication unit 140 to delete each object downloaded in Step S61, and deletes records corresponding to these objects from the object management table 115. When the above processing is completed, the defragmentation processing is terminated.

As described in above Steps S61 to S70, in initial defragmentation of the object group, a new object is reconstructed by recombining valid chunks included in all objects in the object group irrespective of the original object.

For example, when the processing in Step S65 to S67 is repeated, valid chunks that are close to each other in chunk number and the number of references ((2/3)R or more and R or less) are consecutively incorporated into the object. In such case, due to the threshold M_H, a relatively large object is generated.

On the contrary, when No is determined in Step S65, a valid chunk having a large difference in the number of references appears. In this case, it is highly likely that a valid chunk of different property such as a valid chunk in a different file or less relevant file appears. For example, when No is determined in Step S65, it is highly likely that a valid chunk of different property is present in an area to be determined whether it is incorporated into the object. In the case of combining the valid chunk in such area with the object, invalid chunks tend to occur at dispersed positions at different times in the object, and when the size of the object is increased the efficiency of defragmentation is highly likely to lower. Thus, by using the threshold M_L less than the threshold M_H in Step S68, an object of small size is generated.

When Yes is determined in Step S68, valid chunks in an area where the number of references largely varies are incorporated into the object and thus, the number of references of the valid chunks becomes a relatively small value. Thus, by using the threshold M_L, the size of the object including the valid chunks having a relatively small number of references may be expected to become small.

The description continues below by using FIG. 21. In the second and subsequent defragmentation, processing in Step S3 and subsequent steps is executed.

[Step S53] The defragmentation processing unit 133 selects one object belonging to the object group to be processed. The object belonging to the object group to be processed is identified based on the chunk number registered in the record in the defragmentation determination table 116 corresponding to the object group and the object number associated with this chunk number in the chunk management table 113.

[Step S54] The defragmentation processing unit 133 refers to the record corresponding to the object selected in Step S53 among the records in the object management table 115, and acquires the number of valid chunks and the number of invalid chunks from this record. The defragmentation processing unit 133 calculates the ratio of the number of invalid chunks to the total number of chunks (a sum of the number of valid chunks and the number of invalid chunks), and determines whether or not the ratio of the number of invalid chunks exceeds a predetermined threshold (For example, 30%). The defragmentation processing unit 133 moves the processing to Step S55 when the ratio of the ratio of the number of invalid chunks exceeds the threshold, and moves the processing to Step S59 when the ratio of the number of invalid chunks is the threshold or less.

[Step S55] The defragmentation processing unit 133 requests the cloud communication unit 140 to acquire the object selected in Step S53. The cloud communication unit 140 downloads the object from the cloud storage 240 according to the GET command.

[Step S56] The defragmentation processing unit 133 combines only valid chunks among the chunks included in the object acquired in Step S55 to reconstruct an object.

[Step S57] The defragmentation processing unit 133 resets the number of invalid chunks registered in the record corresponding to the object acquired in Step S55 among the records in the object management table 115 to "0". The defragmentation processing unit 133 identifies the record corresponding to the object group to which the concerned object belongs (the record that registers the chunk number of chunks included in the concerned object) from the defragmentation determination table 116. The defragmentation processing unit 133 deletes the chunk number of the invalid chunks removed by object reconstruction from the item of chunk number in the identified record, and subtracts the number of removed invalid chunks from the number of invalid chunks registered in the identified record.

[Step S58] The defragmentation processing unit 133 request the cloud communication unit 140 to upload the object reconstructed in Step S56. The cloud communication unit 140 uploads the object to the cloud storage 240 according to the PUT command. In fact, after the original object downloaded in Step S55 is deleted, the reconstructed object is uploaded.

[Step S59] The defragmentation processing unit 133 determines whether or not all objects belonging to the object group to be processed have been processed. The defragmentation processing unit 133 moves the processing to Step S53 when any unprocessed object is present, and selects one unprocessed object. Meanwhile, the defragmentation processing unit 133 terminates the defragmentation processing when all objects have been processed.

As described in above Steps S53 to S59, in the second or subsequent defragmentation of the object group, defragmentation in units of objects is executed by combining valid chunks into a single object to reconstruct an object.

The processing illustrated in FIG. 22 may be modified such that the size of the new object generated by combining chunks having a relatively small number of references becomes smaller than the size of the new object generated by combining chunks having a large number of references at a higher provability. For example, the determination processing in Step S67 in FIG. 22 may be modified as illustrated in FIG. 23.

Figure 23:
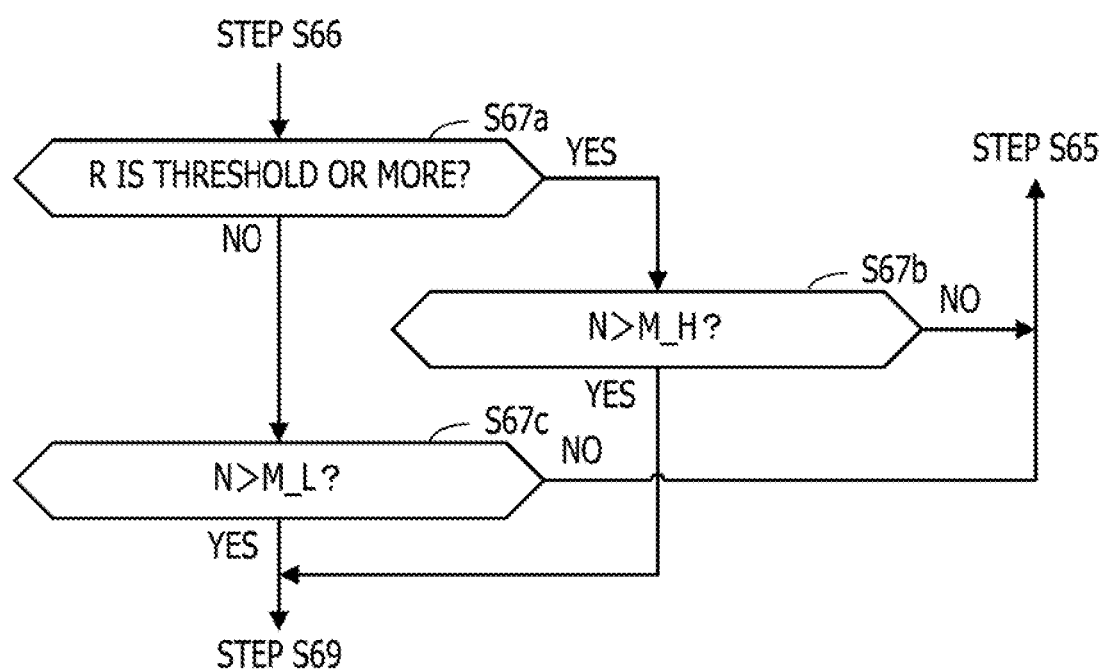
FIG. 23 is a flowchart illustrating a modification example of defragmentation processing.

FIG. 23 is a flowchart illustrating a modification example of the defragmentation processing.

[Step S67a] The defragmentation processing unit 133 determines whether or not the current number of references R is a predetermined threshold or more. Two or more integer is set as the threshold. The defragmentation processing unit 133 moves the processing to Step S67b when the number of references R is the threshold or more, and moves the processing to Step S67c when the number of references R is smaller than the threshold.

[Step S67b] The defragmentation processing unit 133 determines whether or not the number of chunks N is larger than the threshold M_H. The defragmentation processing unit 133 moves the processing to Step S69 when the number of chunks N is larger than the threshold M_H, and moves the processing to Step S65 when the number of chunks N is the threshold M_H or less.

[Step S67c] The defragmentation processing unit 133 determines whether or not the number of chunks N is larger than the threshold M_L. The defragmentation processing unit 133 moves the processing to Step S69 when the number of chunks N is larger than the threshold M_L, and moves the processing to Step S65 when the number of chunks N is the threshold M_L or less.

Through such processing, the size of the new object generated by combining the chunk having the number of references less than the threshold in Step S67a may be smaller than the size of the new object generated by combining the chunk having the number of references of the threshold or more at a higher provability. The thresholds used in Steps S67b, S67c may be different from the threshold M_H, M_L, respectively. For example, the threshold used in Step S67b may be smaller than the threshold M (see Step S24 in FIG. 19), and the threshold used in Step S67c only may to be smaller than the threshold used in Step S67b.

As described above, according to the second embodiment, a predetermined number of chunks are assigned to an object, the object is made inactive. However, in another approach, for example, when the total size of chunks assigned to an object exceeds predetermined size, the object may be inactive.

In this case, in Step S24 in FIG. 19, it is determined whether or not the total size of untransmitted chunks exceeds a predetermined size (SZ), the processing in Step S25 is executed when the total size exceeds the predetermined size, and the processing in Step S27 is executed when the total size does not exceed the predetermined size. In Step S67 in FIG. 22, it is determined whether or not the size of the object being generated is larger than a predetermined size (SZ_H), processing in Step S69 is executed when the size is larger than the predetermined size, and processing in Step S65 is executed when the size is not larger than the predetermined size. In Step S68 in FIG. 22, it is determined whether or not the size of the object being generated is larger than a predetermined size (SZ_L), the processing in Step S69 is executed when the size of the object being generated is larger than the predetermined size, and the processing in Step S63 is executed when the size of the object being generated is not larger than the predetermined size. Wherein, SZ>SZ_H>SZ_L.

In Step S67b in FIG. 23, it is determined whether or not the size of the object being generated is larger than SZ_H, processing in Step S69 is executed when the size is larger than SZ_H, and processing in Step S65 is executed when the size is not larger than SZ_H. In Step S67c in FIG. 23, it is determined whether or not the size of the object being generated is larger than SZ_L, the processing in Step S69 is executed when the size is larger than SZ_L, and the processing in Step S65 is executed when the size is not larger than SZ_L.

The processing functions of the apparatuses (for example, the information processing apparatus 10 and the cloud storage gateway 100) illustrated in the above embodiments may be implemented by a computer. In such a case, there is provided a program describing processing contents of functions to be included in each apparatus, and the computer executes the program to implement the aforementioned processing functions in the computer. The program describing the processing contents may be recorded on a computer-readable recording medium. The computer-readable recording medium includes a magnetic storage device, an optical disc, a magneto-optical recording medium, a semiconductor memory, and the like. The magnetic storage device includes a hard disk drive (HDD), a magnetic tape, and the like. The optical disc includes a compact disc (CD), a digital versatile disc (DVD), a Blu-ray disc (BD, registered trademark), and the like. The magneto-optical recording medium includes a magneto-optical (MO) disk and the like.

In order to distribute the program, for example, portable recording media, such as DVDs and CDs, on which the program is recorded are sold. The program may also be stored in a storage device of a server computer and be transferred from the server computer to other computers via a network.

The computer that executes the program, for example, stores the program recorded on the portable recording medium or the program transferred from the server computer in its own storage device. The computer then reads the program from its own storage device and performs processing according to the program. The computer may also directly read the program from the portable recording medium and perform processing according to the program. The computer may also sequentially perform processes according to the received program each time the program is transferred from the server computer coupled to the computer via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory, and
   a processor coupled to the memory and configured to:
   store a plurality of data sets acquired by deduplicating a plurality of write data sets, for which writing is requested, in an external storage, two or more data sets selected from the plurality of data sets in order of data sets generated are collected in an object and stored in the external storage;
   determine a necessity or unnecessity of defragmentation for each of object groups in each of which two or more objects among the objects stored in the external storage are collected in order of objects generated;
   when determining to execute defragmentation of one object group among the object groups, execute first defragmentation processing of acquiring all of the objects included in the one object group as first objects from the external storage, combining valid data sets each having a number of references of one or more among the data sets included in the first objects to generate one or more second objects based on the order of data sets generated and the number of references of the valid data sets, and storing the one or more second objects in place of the first objects in the external storage,
   in the first defragmentation processing, the valid data sets determined to be close to each other in the order generated and the number of references among the valid data sets are incorporated into the same second object.

2. The information processing apparatus according to claim 1, wherein in the first defragmentation processing, a size of each of the one or more second object is variable based on a result of comparison of the number of references of the incorporated valid data sets and a predetermined reference value.

3. The information processing apparatus according to claim 2, wherein in the first defragmentation processing, a size of a second object in which the number of references of the incorporated valid data sets is smaller than the predetermined reference value is made smaller than a size of a second object in which the number of references of the incorporated valid data sets is larger than the predetermined reference value.

4. The information processing apparatus according to claim 1, the processor further configured to:
   individually determine the necessity or unnecessity of defragmentation of each of the one or more second objects stored in the external storage, and
   when determining to execute defragmentation of one second object among the one or more second objects, execute second defragmentation processing of acquiring the one second object from the external storage, collect only data sets having the number of references of 1 or more among data sets included in the one second object to regenerate a third object, and store the third object in place of the one second object in the external storage.

5. The information processing apparatus according to claim 1, wherein
   in determining the necessity or unnecessity of defragmentation in units of the object group, determine based on a number of data sets having the number of references of 0 among data sets included in each of the object groups, and the first defragmentation processing is executed after an elapse of a predetermined time since defragmentation of the one object group has determined to be executed.

6. A non-transitory computer-readable recording medium storing therein an information processing program that causes a computer to execute an information processing process, the process comprising:

storing a plurality of data sets acquired by deduplicating a plurality of write data sets, for which writing is requested, in an external storage, two or more data sets selected from the plurality of data sets in order of data sets generated are collected in an object and stored in the external storage;

determining a necessity or unnecessity of defragmentation for each of object groups in each of which two or more objects among the objects stored in the external storage are collected in order of objects generated;

when determining to execute defragmentation of one object group among object groups, executing first defragmentation processing of acquiring all of the objects included in the one object group as first objects from the external storage, combining valid data sets each having a number of references of one or more among the data sets included in the first objects to generate one or more second objects based on the order of data sets generated and the number of references of the valid data sets, and storing the one or more second objects in place of the first objects in the external storage, in the first defragmentation processing, the valid data sets determined to be close to each other in the order generated and the number of references among the valid data sets are incorporated into the same second object.

7. The recording medium according to claim 6, wherein in the first defragmentation processing, a size of each of the one or more second object is variable based on a result of comparison of the number of references of the incorporated valid data sets and a predetermined reference value.

8. The recording medium according to claim 7, wherein in the first defragmentation processing, a size of a second object in which the number of references of the incorporated valid data sets is smaller than the predetermined reference value is made smaller than the size of the second object in which the number of references of the incorporated valid data sets is larger than the predetermined reference value.

9. The recording medium according to claim 6, the process further comprising:

individually determining the necessity or unnecessity of defragmentation of each of the one or more second objects stored in the external storage, and when determining to execute defragmentation of one second object among the one or more second objects, executing second defragmentation processing of acquiring the one second object from the external storage, collecting only data sets having the number of references of 1 or more among data sets included in the one second object to regenerate a third object, and storing the third object in place of the one second object in the external storage.

10. The recording medium according to claim 6 wherein in determining the necessity or unnecessity of defragmentation in units of the object group, determining based on a number of data sets having the number of references of 0 among data sets included in each of the object groups, and the first defragmentation processing is executed after an elapse of a predetermined time since defragmentation of the one object group has determined to be executed.

11. A method of information processing comprising:

deduplicating a plurality of write data sets for which writing is requested;

acquiring the plurality of data sets;

storing the plurality of data sets in a storage device;

selecting two or more data sets from the plurality of data sets;

collecting the two or more data sets into one or more objects;

storing the one or more objects in the storage device;

collecting two or more of the objects into the storage device;

determining whether defragmentation of the two or more objects into object groups is to be performed;

when a determination is made to execute defragmentation of an object group, executing first defragmentation processing including:

retrieving from the storage device all objects in the one object group as first objects;

combining valid data sets each having a number of references of one or more among data sets included in the first objects to generate one or more second objects based on an order of data sets generated and the number of references of the valid data sets; and replacing the first objects in the storage device with the one or more second objects, in the first defragmentation processing, the valid data sets determined to be close to each other in the order generated and the number of references among the valid data sets are incorporated into the same second object.

* * * * *